United States Patent
Tariq et al.

(10) Patent No.: US 7,949,336 B2
(45) Date of Patent: May 24, 2011

(54) ACCESS CONTROL IN A CELLULAR SYSTEM

(75) Inventors: Ahmed Tariq, Port Coquitlam (CA); Elliott Hoole, Sammamish, WA (US); Yan Zhang, Bellevue, WA (US); Donald P. Wahlstrom, Woodinville, WA (US); Jayesh Sukumaran, Woodinville, WA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/811,877

(22) Filed: Jun. 12, 2007

(65) Prior Publication Data

US 2008/0026726 A1    Jan. 31, 2008

Related U.S. Application Data

(60) Provisional application No. 60/830,037, filed on Jul. 11, 2006.

(51) Int. Cl.
*H04W 36/00* (2009.01)

(52) U.S. Cl. .......... 455/436; 455/435.1; 455/432.1; 455/465

(58) Field of Classification Search .......... 455/436, 455/435.1, 432.1, 465
See application file for complete search history.

(56) References Cited

U.S. PATENT DOCUMENTS

| | | | | |
|---|---|---|---|---|
| 5,749,053 | A * | 5/1998 | Kusaki et al. | 455/524 |
| 6,061,565 | A * | 5/2000 | Innes et al. | 455/436 |
| 7,738,922 | B2 | 6/2010 | Hashimoto et al. | |
| 2002/0082006 | A1 | 6/2002 | Narvanen et al. | |
| 2003/0143986 | A1 | 7/2003 | Mufti et al. | |
| 2004/0082314 | A1 | 4/2004 | Shaw et al. | |
| 2004/0087305 | A1* | 5/2004 | Jiang et al. | 455/432.1 |
| 2004/0204097 | A1* | 10/2004 | Scheinert et al. | 455/561 |
| 2005/0070283 | A1* | 3/2005 | Hashimoto et al. | 455/435.1 |
| 2007/0054668 | A1* | 3/2007 | Scheinert et al. | 455/435.1 |
| 2007/0153736 | A1* | 7/2007 | Mow et al. | 370/331 |
| 2007/0189254 | A1* | 8/2007 | Tariq et al. | 370/338 |
| 2008/0188221 | A1 | 8/2008 | Hashimoto et al. | |
| 2008/0304494 | A1 | 12/2008 | Yokoyama | |
| 2009/0061873 | A1* | 3/2009 | Bao et al. | 455/436 |

FOREIGN PATENT DOCUMENTS

| | | |
|---|---|---|
| CN | 1602110 | 3/2005 |
| CN | 100574525 | 12/2009 |
| EP | 1519613 | 3/2005 |
| JP | 2005109570 | 4/2005 |

* cited by examiner

*Primary Examiner* — Barry W Taylor
(74) *Attorney, Agent, or Firm* — McAndrews, Held & Malloy, Ltd.

(57) ABSTRACT

Controlling use of a mobile network element is disclosed. An indication is received that a mobile station associated with a mobile network is attempting to access the mobile network via a base transceiver station that (1) the mobile station is not authorized to use and (2) is located within a geographic area from which the mobile station is authorized to access the mobile network. The mobile station is prevented from accessing the mobile network via the base transceiver station.

20 Claims, 22 Drawing Sheets

ACCESS CONTROL IN A CELLULAR SYSTEM

CROSS REFERENCE TO OTHER APPLICATIONS

This application claims priority to U.S. Provisional Patent Application No. 60/830,037, entitled Method of Access Control in a Cellular System, filed Jul. 11, 2006, which is incorporated herein by reference for all purposes.

BACKGROUND OF THE INVENTION

Traditionally, mobile telecommunications have been provided via a network of fixed, large scale base transceiver stations (BTS) connected via dedicated, fixed lines, such as T-1/E-1 lines, to a base station controller (BSC) which in turn provided access to a core mobile network via a mobile switching center (MSC). Smaller scale base transceiver stations suitable for deployment in a home or office, e.g., to provide dedicated and/or customized service to a limited number of authorized users, have been proposed. However, there is a need in such situations to ensure that only authorized users, e.g., those who have paid for dedicated equipment/service and/or their invited guests, are allowed to access mobile services via a small scale base transceiver station.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
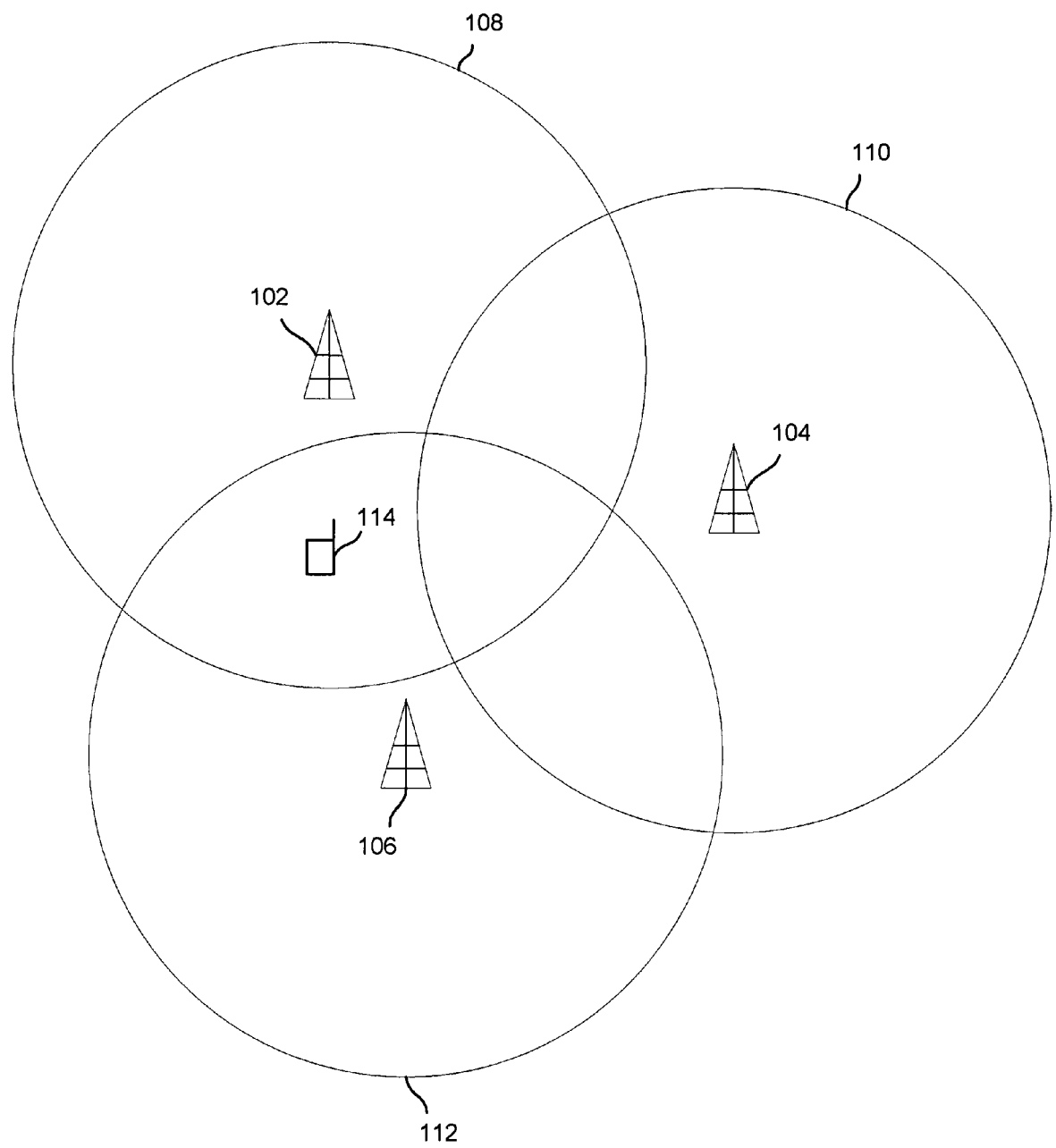
FIG. 1A is a block diagram illustrating an embodiment of a prior art array of base transceiver stations and their associated coverage areas.

FIG. 1A is a block diagram illustrating an embodiment of a prior art array of base transceiver stations and their associated coverage areas. Each of the base transceiver stations (BTS) 102, 104, and 106 has associated with it a corresponding geographic coverage area 108, 110, and 112, respectively, within which its signal is strong enough to be received and used by a mobile station (MS), such as MS 114, to communicate with the core mobile telecommunication network via that BTS.

Figure 1B:
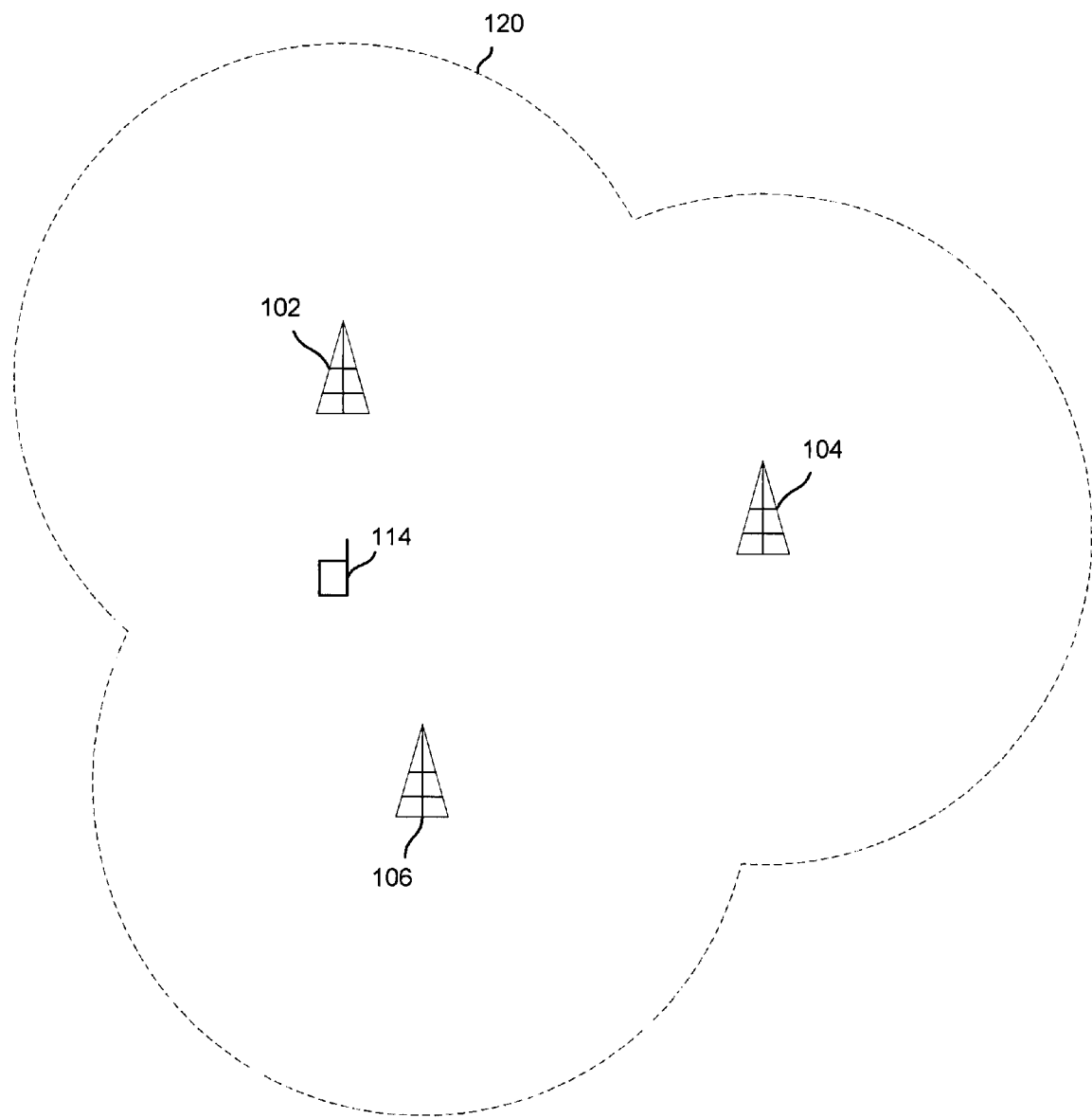
FIG. 1B is a block diagram illustrating an embodiment of a location area within a mobile telecommunications network.

FIG. 1B is a block diagram illustrating an embodiment of a location area within a mobile telecommunications network. In the example shown, the base transceiver stations 102, 104, and 106 are associated with a location area 120. In some embodiments, a location area code (LAC) is associated with and identifies the location area 120. Whether the MS 114 would be permitted to access a GSM or other public land mobile network (PLMN), or other mobile telecommunications network, with which the location area 120 is associate would be determined in some embodiments at least in part on whether a subscriber identification module (SIM) or other identifying data and/or device associated with the MS 114 is authorized to communication via the PLMN or other network within the location area 120, e.g., as determined by checking whether the SIM or other identifying data is associated with a LAC associated with the location area 120, e.g., in a home location register (HLR) and/or other database. Location areas traditionally have been used by mobile service providers to limit a subscriber to using an MS in only certain geographic areas and/or to apply differential billing.

Figure 2:
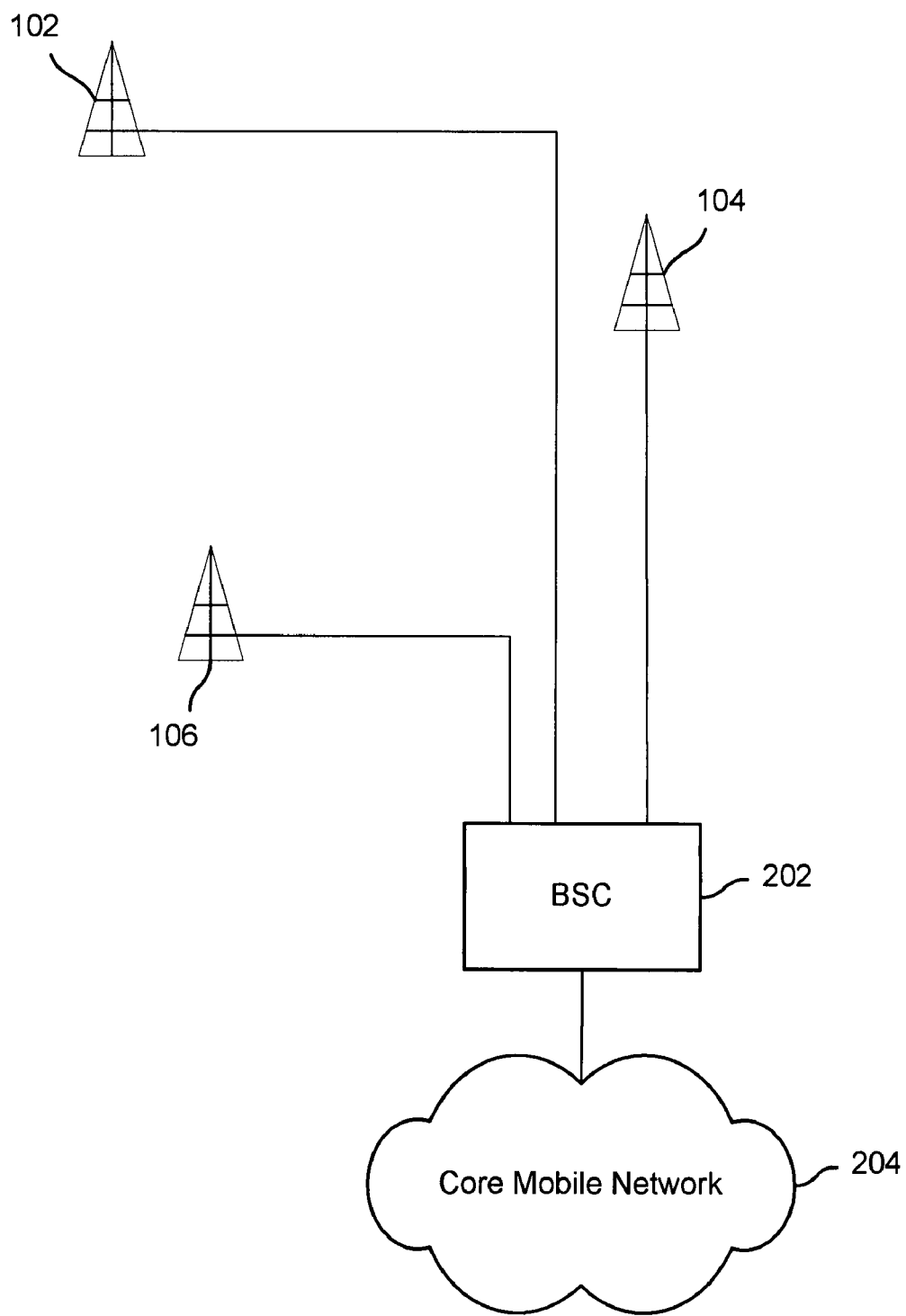
FIG. 2 is a block diagram illustrating an embodiment of base station subsystem (BSS) elements in a typical prior art macrocellular network.

FIG. 2 is a block diagram illustrating an embodiment of base station subsystem (BSS) elements in a typical prior art macrocellular network. In the example shown, the base transceiver stations 102, 104, and 106 of FIG. 1 are shown as each being connected to a base station controller (BSC) 202 via a corresponding dedicated communication link, typically a dedicated T-1/E-1 line. In a GSM network, the dedicated link is known as the Abis interface. The BSC 202 provides access to the core mobile network 204, in a GSM network typically via a mobile switching center (MSC) in the case of voice traffic and control messages and a serving GPRS support node (SGSN) in the case of packet data traffic.

Figure 3:
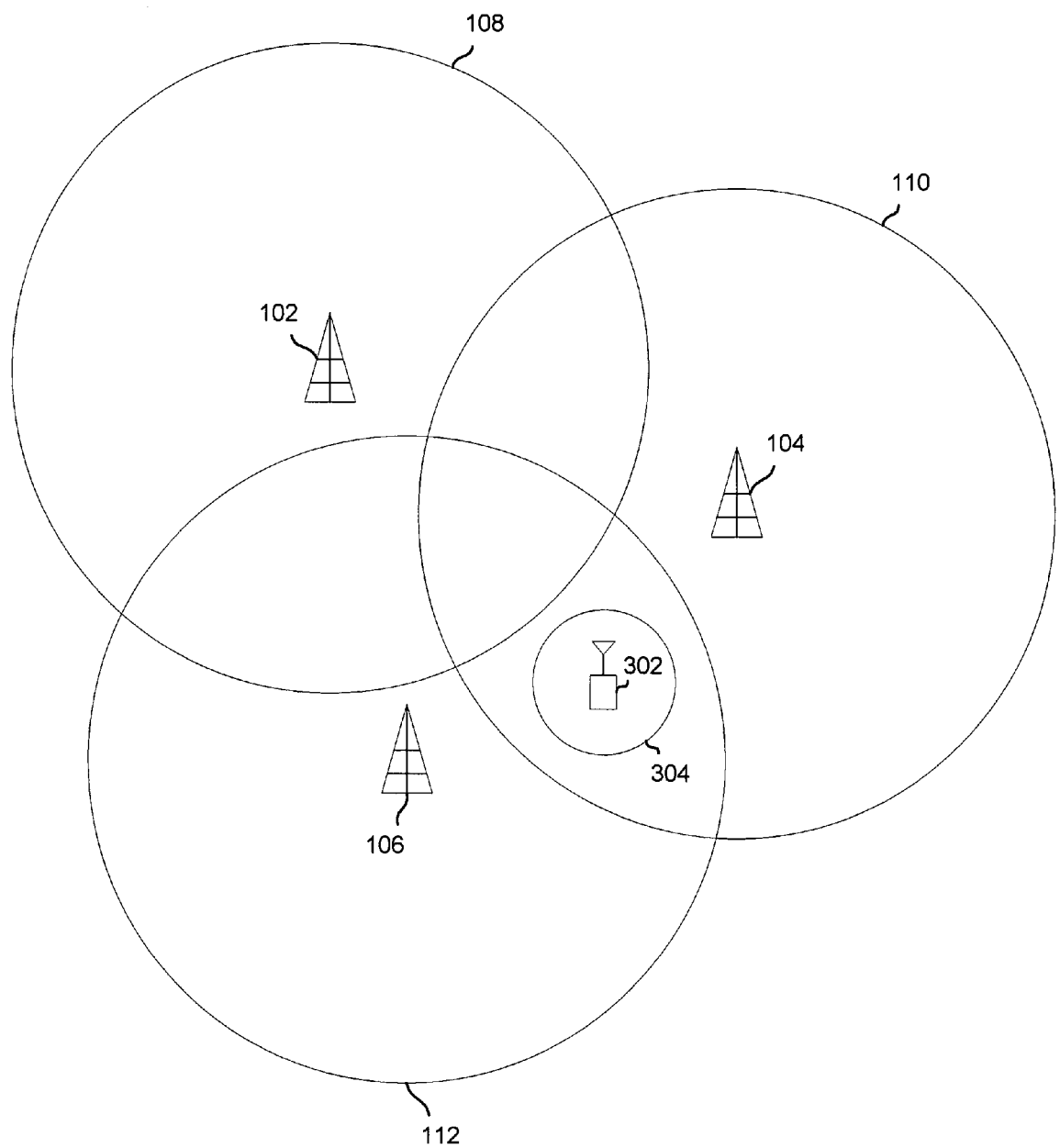
FIG. 3 is a block diagram illustrating an embodiment of a cellular network in which a small scale base transceiver station, such as a micro-, pico-, femto-, or other small scale BTS, has been deployed.

FIG. 3 is a block diagram illustrating an embodiment of a cellular network in which a small scale base transceiver station, such as a micro-, pico-, femto-, or other small scale BTS, has been deployed. In the example shown, a small scale BTS 302 having an associated coverage area 304 has been deployed in the cellular network of FIG. 1, in a location such that a coverage area 304 overlaps with (and in this example, for clarity, is included entirely within) a region in which the coverage area 110 of BTS 104 and the coverage area 112 of BTS 106 overlap. In various embodiments, the small scale BTS 302 may be deployed in a home, office, small business, or other environment, e.g., to provide dedicated and/or lower cost coverage to one or more authorized users associated with the location in which the small scale BTS 302 has been deployed. A small scale BTS is sometimes referred to herein as a "home BTS" or "HBTS", which terms are intended to include any small scale BTS suitable for deployment in a home or other location to provide dedicated coverage to authorized users associated with the location, e.g., persons who live and work in that location and/or authorized visitors, etc.

Figure 4:
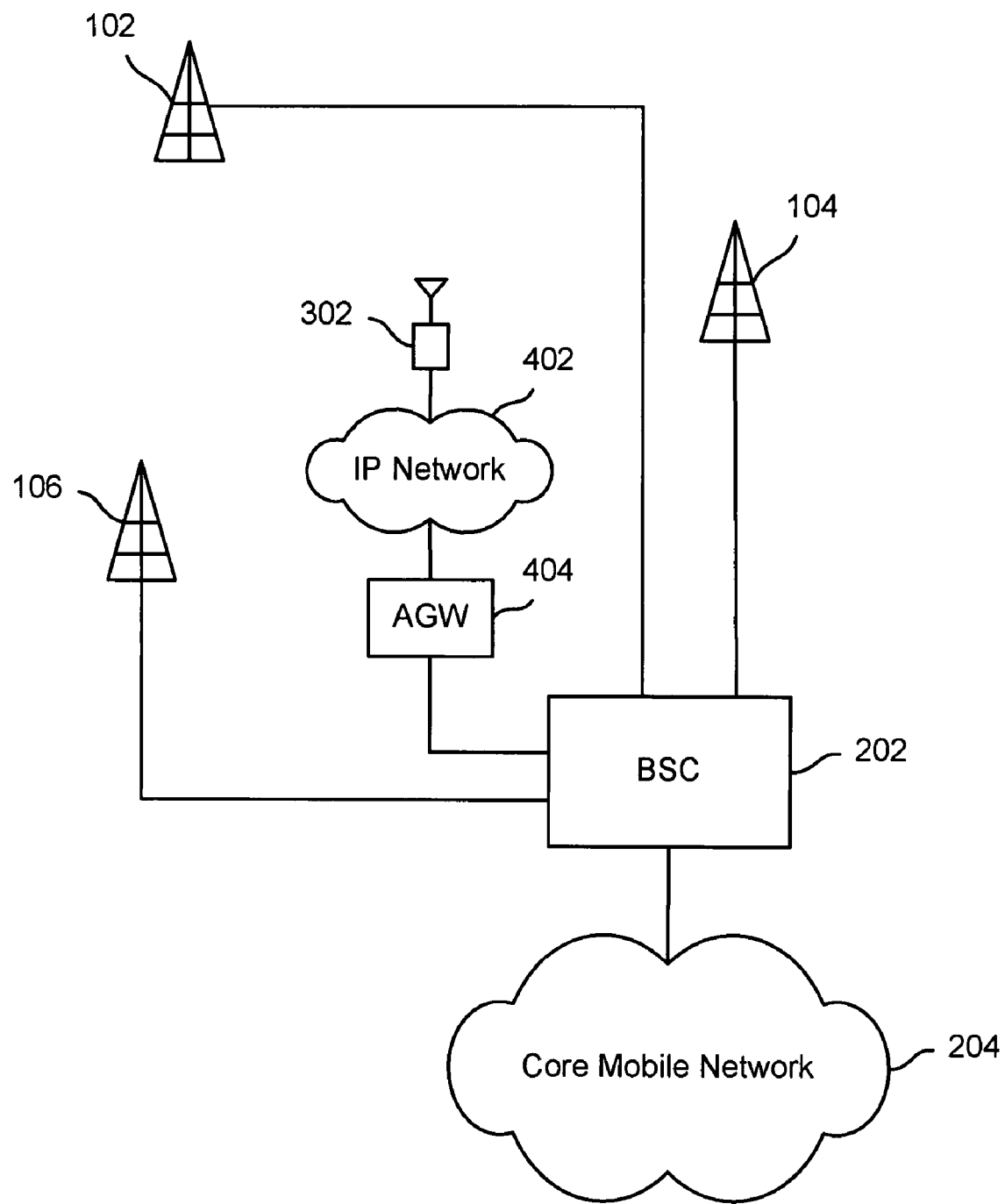
FIG. 4 is a block diagram illustrating an embodiment of a small scale BTS with IP network backhaul.

FIG. 4 is a block diagram illustrating an embodiment of a small scale BTS with IP network backhaul. As noted above, the macro-BTS's 102, 104, and 106 communicate with the core mobile network via a dedicated land line (e.g., T-1/E-1) to a BSC such as BSC 202. In FIG. 4, the small scale BTS 302 of FIG. 3 is shown as being connected to BSC 202 via an IP network 402 and an aggregation gateway (AGW) 404. In some embodiments, AGW 404 is configured to support one or more small scale BTS's such as BTS 302, aggregating their traffic and translating traffic sent via the IP network 402 using a suitable protocol, e.g., the real-time transport protocol (RTP) for voice traffic, to the Abis (for GSM) or similar interface to the BSC (or equivalent node in a non-GSM network), and vice versa. As high-speed Internet access for homes and small businesses becomes more and more ubiquitous, it has become and will continue to become more and more possible to deploy small scale base stations in homes and businesses, and use IP backhaul to provide connectivity to the core mobile network, avoiding the cost and waste of bandwidth that would attend if each such base station required a dedicated T-1/E-1 or other high capacity connection.

Figure 5:
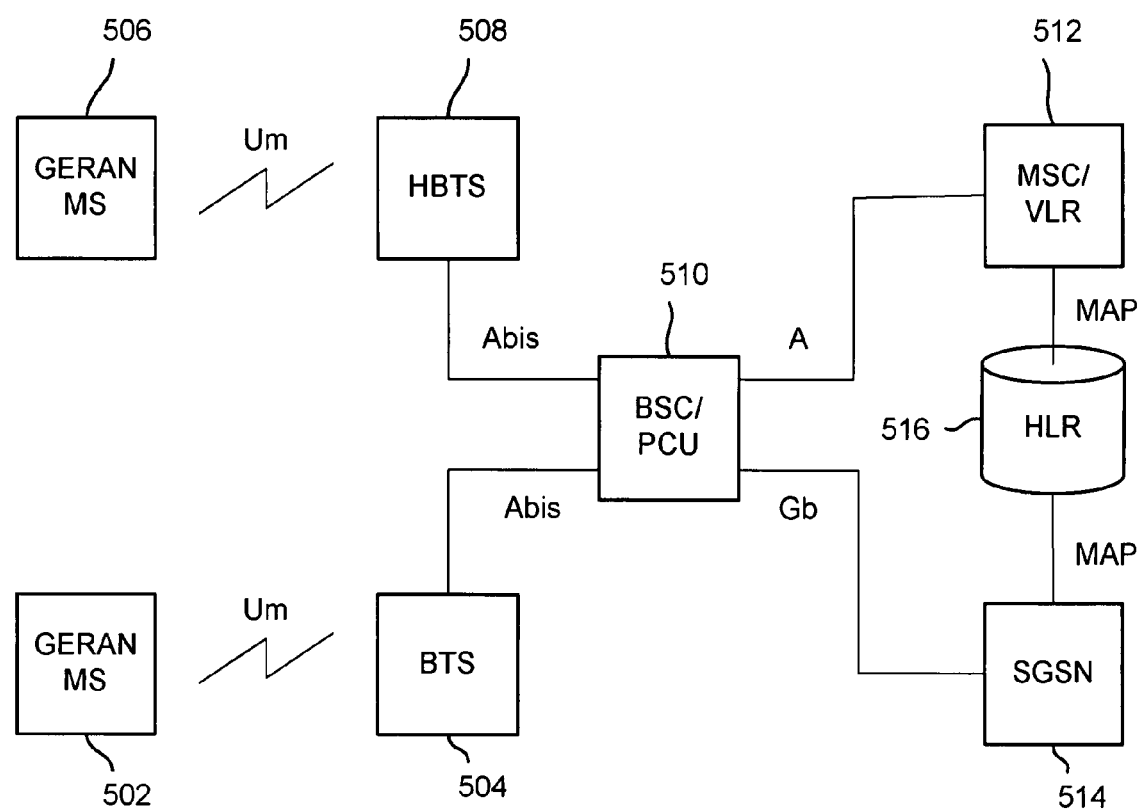
FIG. 5 is a block diagram illustrating an embodiment of a mobile network that includes both macro- and small scale base transceiver stations.

FIG. 5 is a block diagram illustrating an embodiment of a mobile network that includes both macro- and small scale base transceiver stations. In the example shown, a GSM edge radio access network (GERAN) mobile station (MS) 506 is shown communicating via an air (Um) interface to an HBTS 508, which communicates over an Abis interface (e.g., via an IP or other network, not shown in FIG. 5) with a base station controller (BSC)/packet control unit (PCU) 510. A GERAN MS 502 similarly is shown communicating via the Um air interface with a macro-BTS 504, which also communicates via the Abis interface with BSC/PCU 510. BSC/PCU 510 in turn provides connectivity via the A interface to a mobile switching center (MSC) 512 for voice communications and related signaling and via the Gb interface to a serving GPRS support node (SGSN) 514 for non-voice (packet) data. The MSC 512 and SGSN 514 each communicate with a home location register (HLR) 516 via a mobile application part (MAP) interface. In some embodiments, the HLR 516 comprises data associated with each of one or more location areas, a set of one or more users, and/or mobile stations authorized to access the mobile network via a base transceiver associated with that location area. In some embodiments, the MS is identified by a subscriber identity module (SIM) included in and associated at the HLR with the MS, and an MS is allowed to access the mobile network only through base transceivers associated with the location area(s) associated with location area codes (LAC) with which the mobile station's SIM has been associated at the HLR 516.

Figure 6:
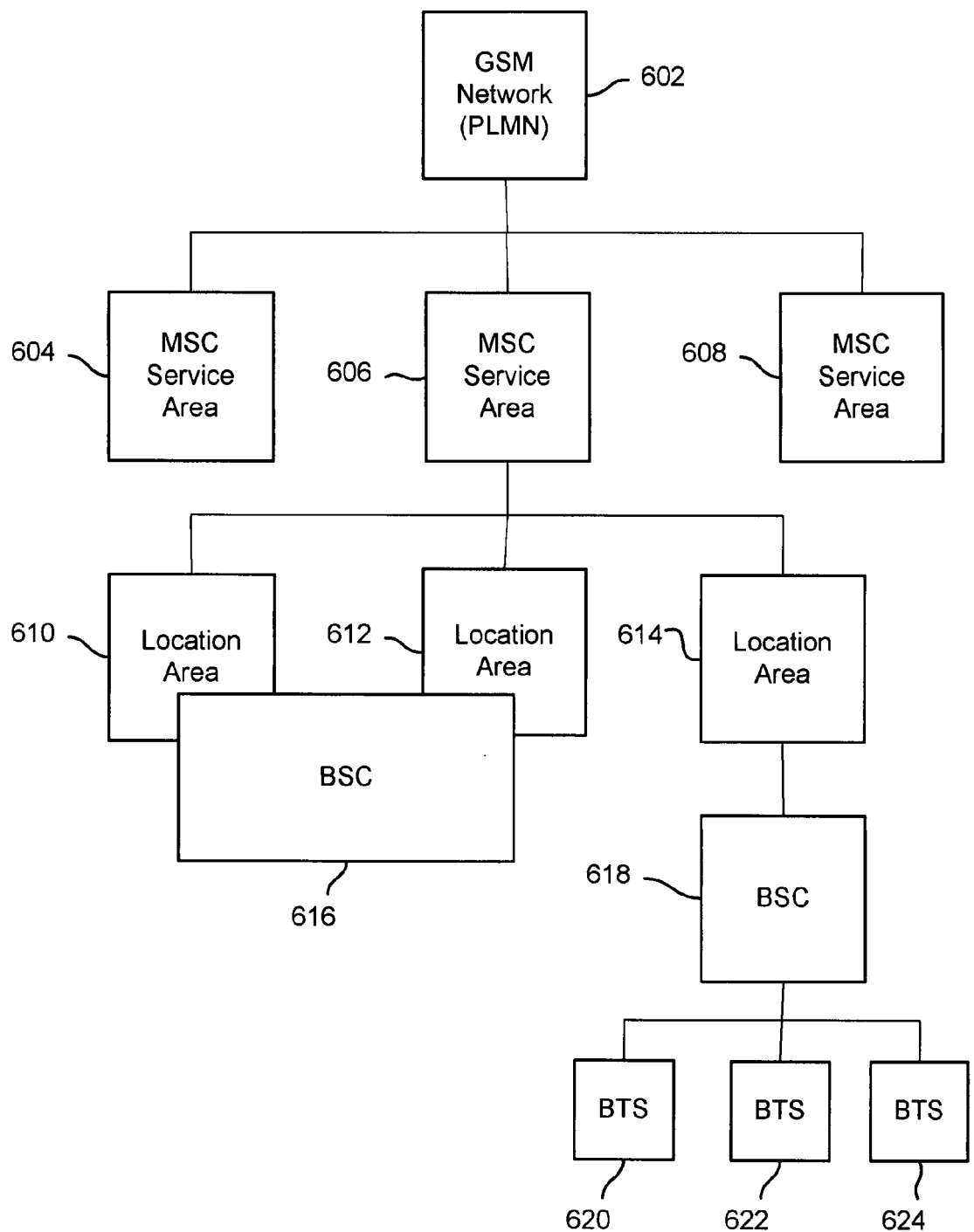
FIG. 6 is a block diagram illustrating an embodiment of a hierarchy of location and/or service areas.

FIG. 6 is a block diagram illustrating an embodiment of a hierarchy of location and/or service areas. A GSM or other public land mobile network (PLMN) 602 is shown in this example as being divided into a plurality of MSC service areas represented in FIG. 6 by MSC service areas 604, 606, and 608. Each MSC service area has one or more location areas associated with it, as represented in FIG. 6 by the location areas 610, 612, and 614 shown as being associated with MSC service area 606. A BSC may be associated with one or more location areas. In the example shown, BSC 616 is associated with location areas 610 and 612, while BSC 618 and base transceiver stations 620, 622, and 624 associated therewith are associated with location area 614. In some embodiments, base transceiver stations 620, 622, and 624 correspond to BTS 102, 104, and 106 of FIGS. 1A and 1B and location area 614 corresponds to location area 120 of FIG. 1B.

Controlling (limiting) access to a mobile network via an HBTS or other small scale BTS to a subset of a service provider's users who are included in a set of one or more authorized users of the HBTS or other small scale BTS is disclosed. In some embodiments, user who are customers of a mobile service provider with which an HBTS is associated but who are not authorized to access the service provider's network via that HBTS are not allowed to access the mobile network through that HBTS. Limiting mobile access via an HBTS to a subset of one or more mobile network users by defining for the HBTS (and in some embodiments zero, one, or more other HBTS's) a dedicated location area with which only the subset of users is associated is disclosed. In some embodiments, multiple HBTS's in one or more geographic areas are associated with an HBTS-specific location area with which HBTS-authorized users are associated but non-HBTS users are not. In some embodiments, the foregoing approach allows any user who has paid to install and/or otherwise have access via an HBTS to access the network via his/her own or any other HBTS included in the HBTS-specific location area. In various embodiments, an HBTS-specific location area may overlap partly, entirely, or not at all with one or more other location areas, e.g., traditional macrocellular network location areas associated with one or more macro-BTS's.

Figure 7:
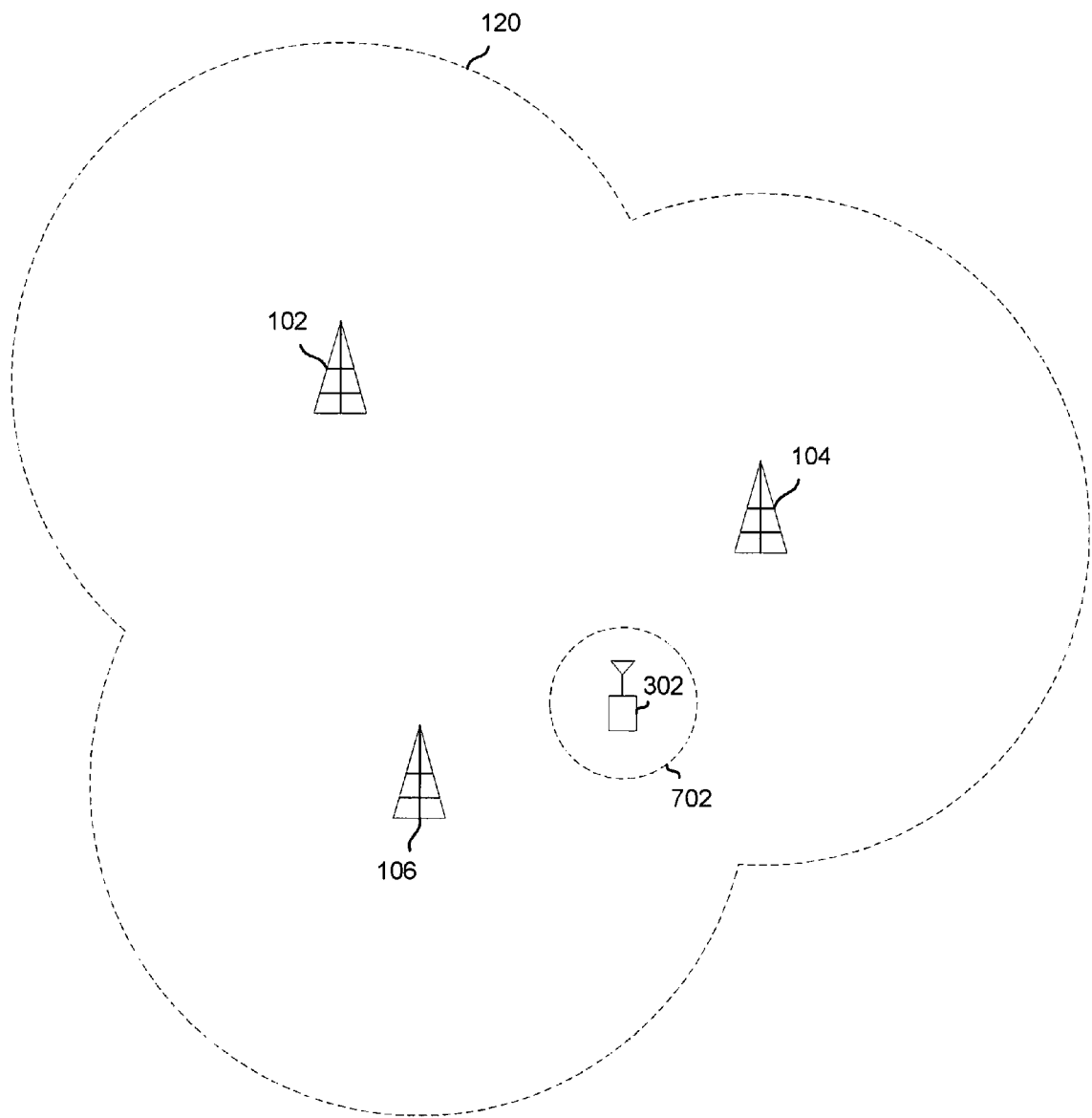
FIG. 7 is a block diagram illustrating an embodiment of a system for controlling access to a mobile network via an HBTS or other small scale BTS.

FIG. 7 is a block diagram illustrating an embodiment of a system for controlling access to a mobile network via an HBTS or other small scale BTS. In the example shown, small scale BTS 302 is shown as being associated with an HBTS-specific location area 702. The HBTS-specific location area 702 is accessible by mobile users that are both within a coverage area of HBTS 302 and associated with the HBTS-specific location area 702. Other users of a mobile network with which HBTS 302 and macro-BTS's 102, 104, and 106 are associated, i.e., those not authorized to access the network via HBTS 302, are not permitted to access the mobile network via HBTS 302 even while within the coverage area of HBTS 302, because the network is configured to refuse such users' attempts to register (i.e., perform a "location update") to obtain access/service via the HBTS 302 as a consequence of their not being associated with (e.g., at the HLR) the HBTS-specific location area 702. Instead, in the example shown such users would in some embodiments continue to access the mobile network, if available, via one of the macro-BTS's 102, 104, and/or 106 (assuming the user is associated with the macrocellular location area 120).

Figure 8:
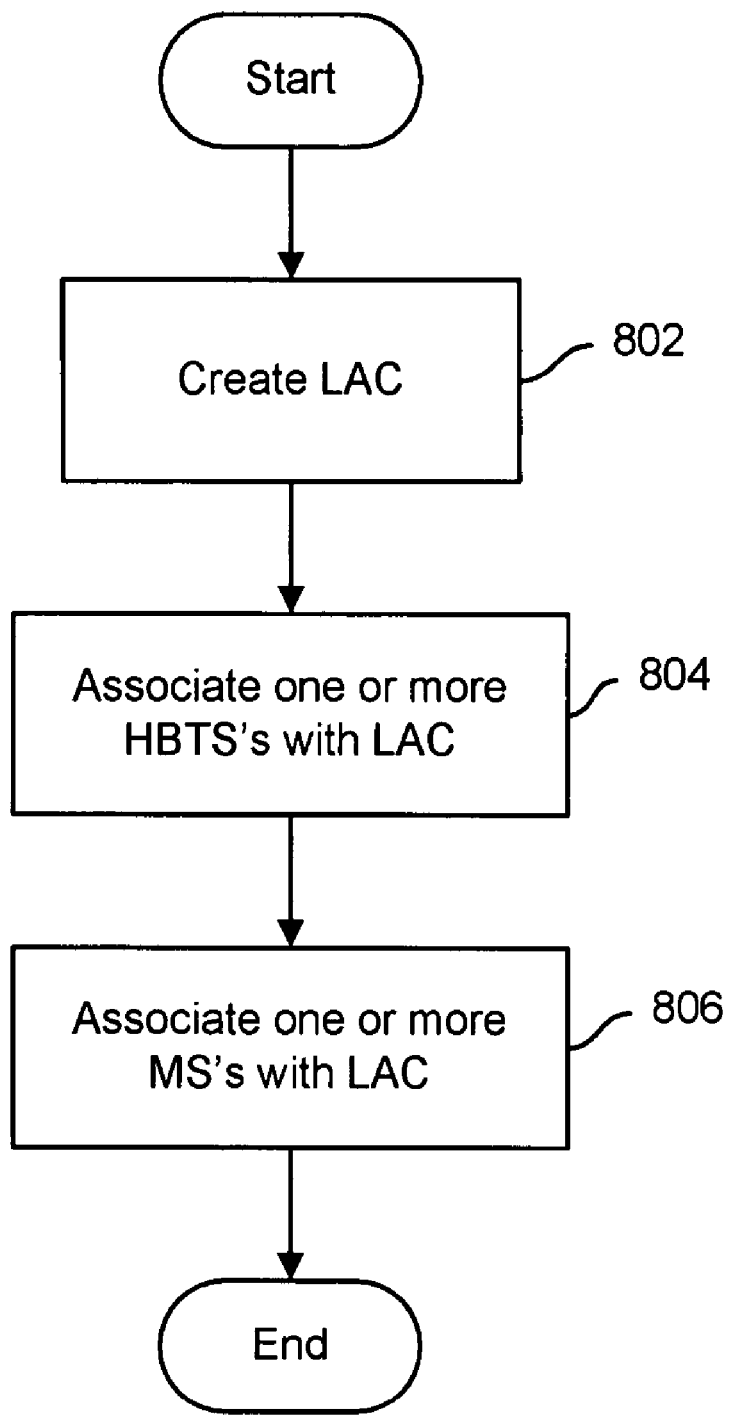
FIG. 8 is a flow chart illustrating an embodiment of a process for controlling access to a mobile network.

FIG. 8 is a flow chart illustrating an embodiment of a process for controlling access to a mobile network. In the example shown, a location area and associated location area code (LAC) are defined, e.g., by establishing appropriate data structures and/or fields in an HLR and/or other database (802). One or more HBTS's is/are associated with the LAC (804), e.g., by entering identifying data in appropriate data fields. One or more mobile stations (MS) are associated with the LAC (806). For example, for each MS to be associated with the HBTS-specific LAC, an IMSI or other identifier associated with the MS is associated, e.g., at the HLR, with the HBTS-specific LAC.

Figure 9:
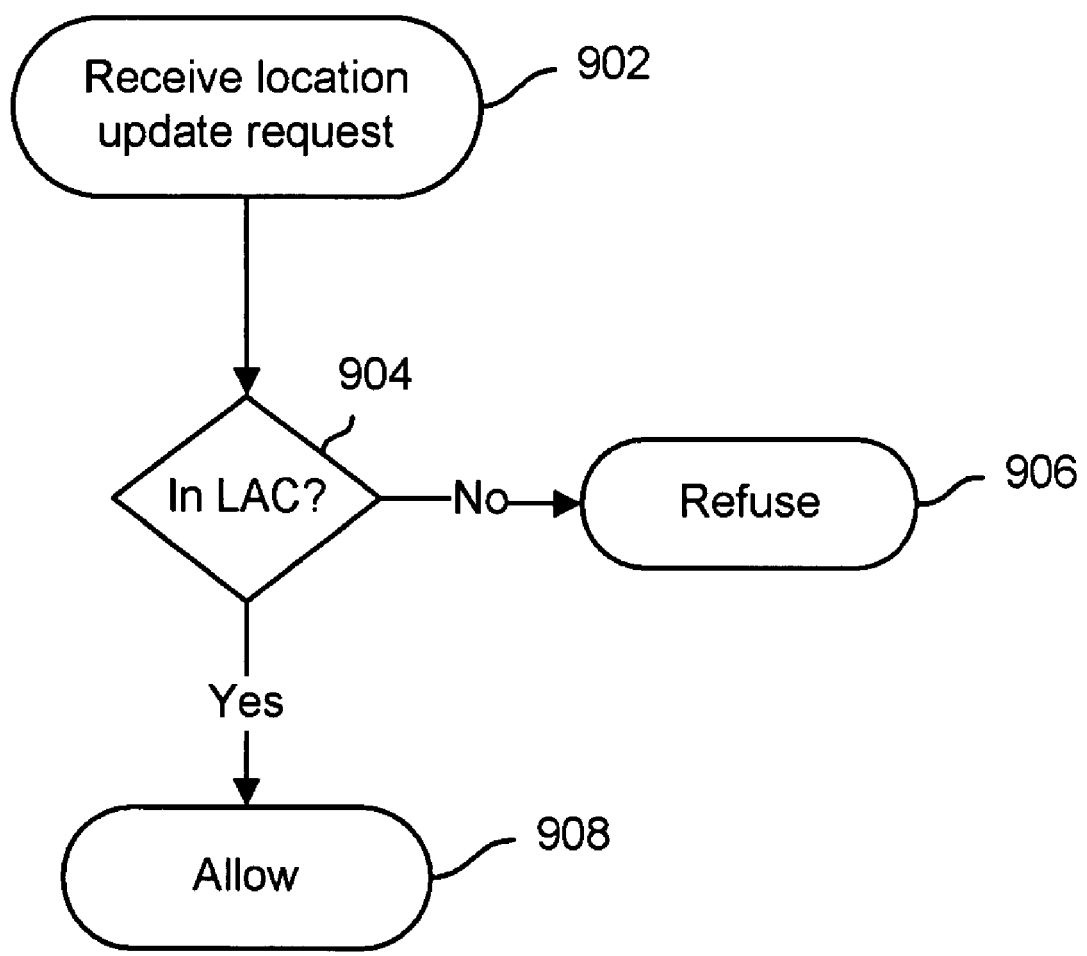
FIG. 9 is a flow chart illustrating an embodiment of a process for controlling access to a mobile network.

FIG. 9 is a flow chart illustrating an embodiment of a process for controlling access to a mobile network. In some embodiments, the process of FIG. 9 is implemented at a mobile switching center (MSC), HLR, and/or other core network element. In the example shown, a location update request is received (902), e.g., via an HBTS. It is determined whether a mobile station (MS) from which the location update request was received is authorized to access the network via that HBTS, in this example by determining whether an IMSI or other identifier associated with the MS is associated (e.g., at the HLR) with an HBTS-specific LAC or other location area identifier with which the HBTS is associated (904). If it is determined that the MS is not associated with an HBTS-specific LAC with which the HBTS is associated (904), the location update request is refused (906). Conversely, if it is determined that the MS is associated with the HBTS-specific LAC (904), the location update request is allowed (908), enabling the MS to access the mobile network via the HBTS.

Configuring a base station subsystem (BSS) element, such as a BSC, or some other node to limit access via an HBTS to a subset of subscribers which are associated with that HBTS—e.g., rather than or in addition to limiting access to subscribers and/or MS's associated with an HBTS-specific location area—is disclosed. In some embodiments, a BSC or other node is configured to determine, e.g., based on the IMSI or another identifier associated with an MS, whether a particular MS is authorized to access the network via an HBTS via which the subscriber is attempting to access the network. If not, the BSC or other node in various embodiments forces a handover to a more appropriate BTS, such as a macro-BTS, if available, and/or drops/blocks the call.

Figure 10:
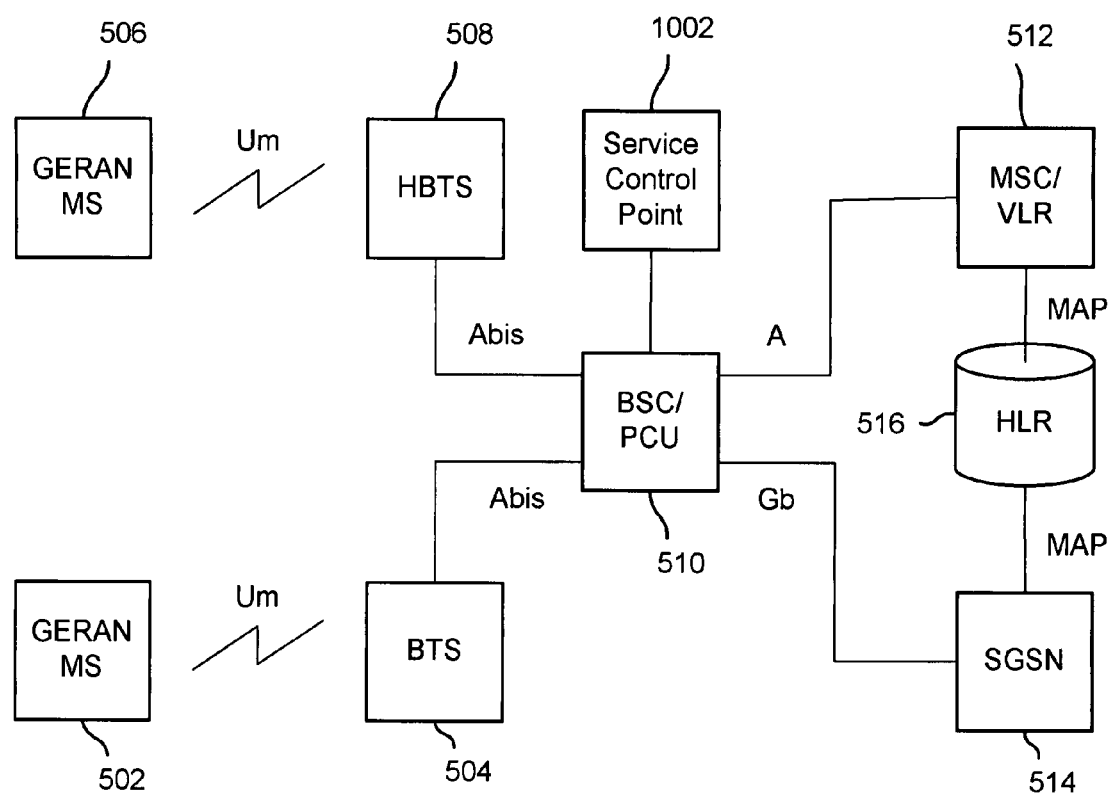
FIG. 10 is a block diagram illustrating an embodiment of a system for controlling access to a mobile network via an HBTS.

FIG. 10 is a block diagram illustrating an embodiment of a system for controlling access to a mobile network via an HBTS. In the example shown, a service control point 1002 has been added to the elements shown in FIG. 5. While shown in FIG. 5 as a separate element, in some embodiments the service control point 1002 is implemented as an element internal to BSC/PCU 510. In some embodiments, service control point 1002 includes a database which identifies, e.g., by IMSI, those MS's that are authorized to access the mobile network via an HBTS associated with the BSC 510, such as HBTS 508 in the example shown. Logic implemented on BSC 510 and/or service control point 1002 determines the IMSI or other identifier associated with an MS accessing or attempting to access the mobile network via the HBTS, determines whether such access by that particular MS via the HBTS is authorized, and if not forces a handover to a more appropriate cell, if available.

In various embodiments, one or more of the following techniques are used by the BSC or other BSS component to determine the IMSI of the MS: the Common ID procedure of BSS Application Part (BSSAP); in case of downlink packet transfer, the IMSI is provided in the downlink LLC PDUs received from the SGSN via BSS GPRS Protocol (BSSGP); in case of uplink packet transfer, the Radio Access Capability Update procedure of BSSGP can be used by the BSS to request the IMSI of the MS; the IMSI may be requested from the MS, directly or indirectly, by sending an encrypted PROVIDE IDENTITY REQUEST, for IMSI, to the MS, sending a PROVIDE IDENTITY REQUEST, for IMEI, to the MS and obtaining the IMSI a table mapping IMSIs & IMEIs, and/or the TMSI of the MS is obtained by sniffing MM messages and the MAP-G interface with the VLR is used to obtain the IMSI; and release 6 of 3GPP provides the option of including the MS IMSI in the PROVIDE LOCATION REQUEST message sent from the Core Network to the BSC/PCU/SMLC.

Figure 11:
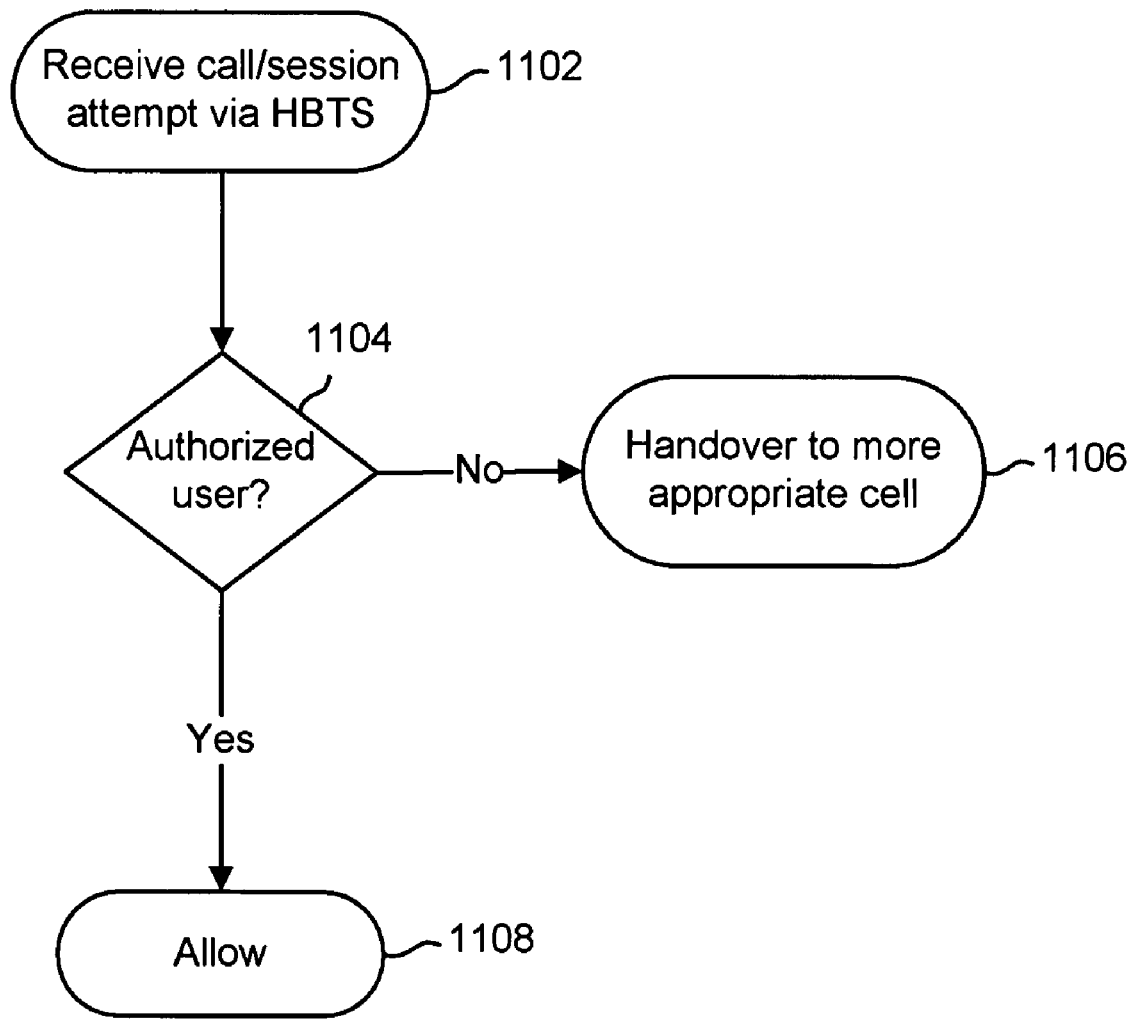
FIG. 11 is a flow chart illustrating an embodiment of a process for controlling access to a mobile network.

FIG. 11 is a flow chart illustrating an embodiment of a process for controlling access to a mobile network. In some embodiments, the process of FIG. 11 is implemented on a BSC or other BSS node. An attempt to establish a call or other session via an HBTS is received (1102). For example, an MS that has updated its location to an HBTS, but which is not authorized to use the HBTS to place or receive calls, etc., attempts to originate a call; or a call to such an MS is attempted to be terminated with the MS via the HBTS. It is determined whether the MS is associated with an authorized use of the HBTS (1104). If not, a handover to a more appropriate cell, e.g., a macro-BTS, if available, is forced (1106). If the MS is determined to be authorized to access the network via the HBTS, the call is processed normally (1108).

Figure 12:
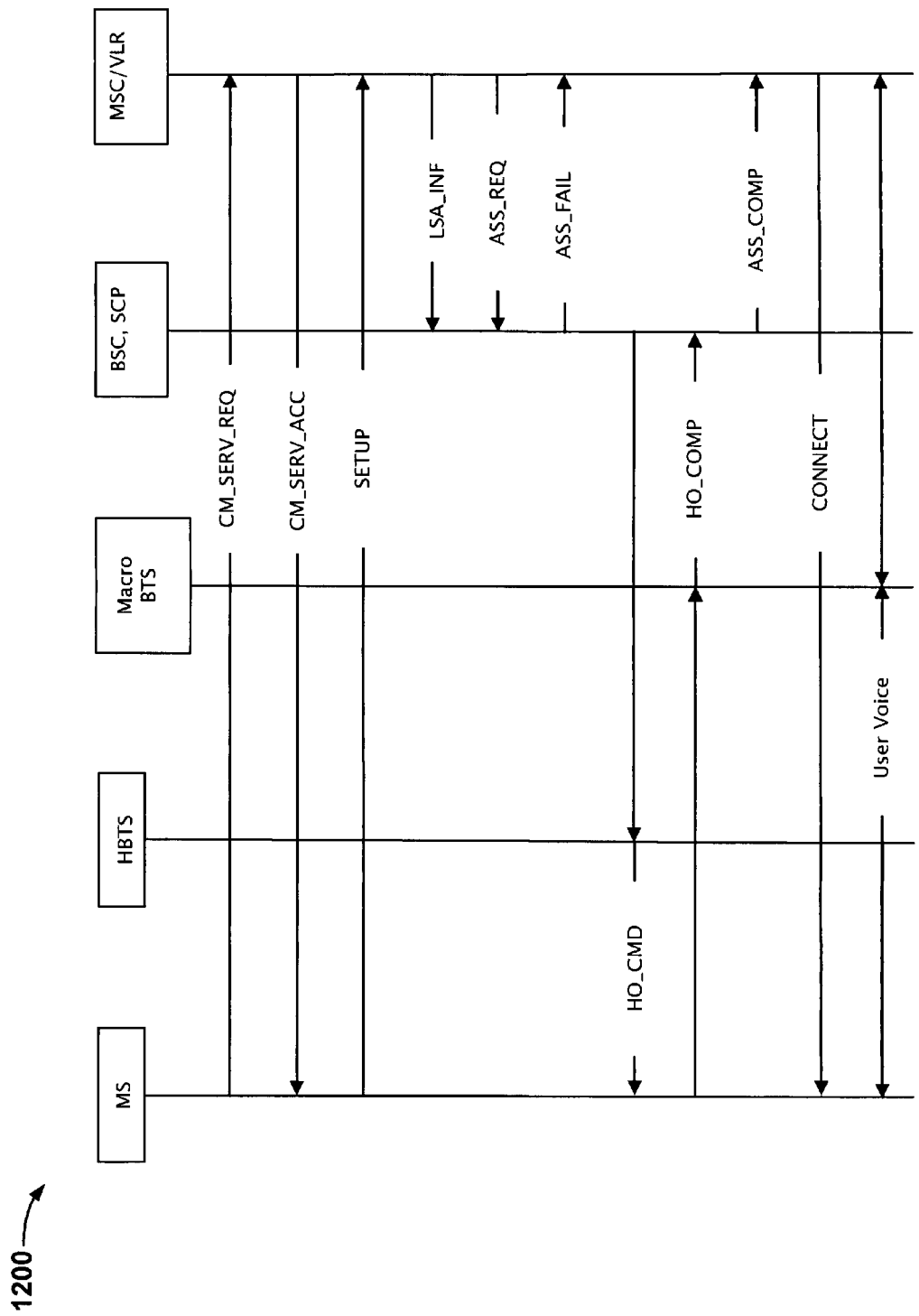
FIG. 12 is a call flow diagram illustrating an embodiment of a process for controlling access to a mobile network in the case of a mobile originated call attempted to be made via an HBTS by a user not authorized to use the HBTS for that purpose.

FIG. 12 is a call flow diagram illustrating an embodiment of a process for controlling access to a mobile network in the case of a mobile originated call attempted to be made via an HBTS by a user not authorized to use the HBTS for that purpose. Upon observing an attempt by the unauthorized MS to originate a call, in the example call flow 1200 the BSC sends to the MS a handover command ("HO_CMD") message instructing the MS to complete a handover to a macro-BTS. Upon receiving a handover complete ("HO_COMP") message from the MS, via the macro-BTS, the BSC allows the call to be established. In some embodiments, the MSC does not send local security association (LSA) information to the BSC, as shown in FIG. 12, and instead the BSC or another BSS component is configured to determine whether the MS is authorized to use the HBTS or not. In some embodiments, the BSC or other BSS component obtains the IMSI of the MS (e.g., either on its own or via the MSC/VLR) and uses the IMSI to query an authorization database. In some embodiments, the BSC or other BSS component is provided, e.g., by the MSC/VLR (e.g., via LSA), in which case the BSS component does not need to know the IMSI of the MS in order to determine whether the MS is authorized to use the HBTS.

Figure 13:
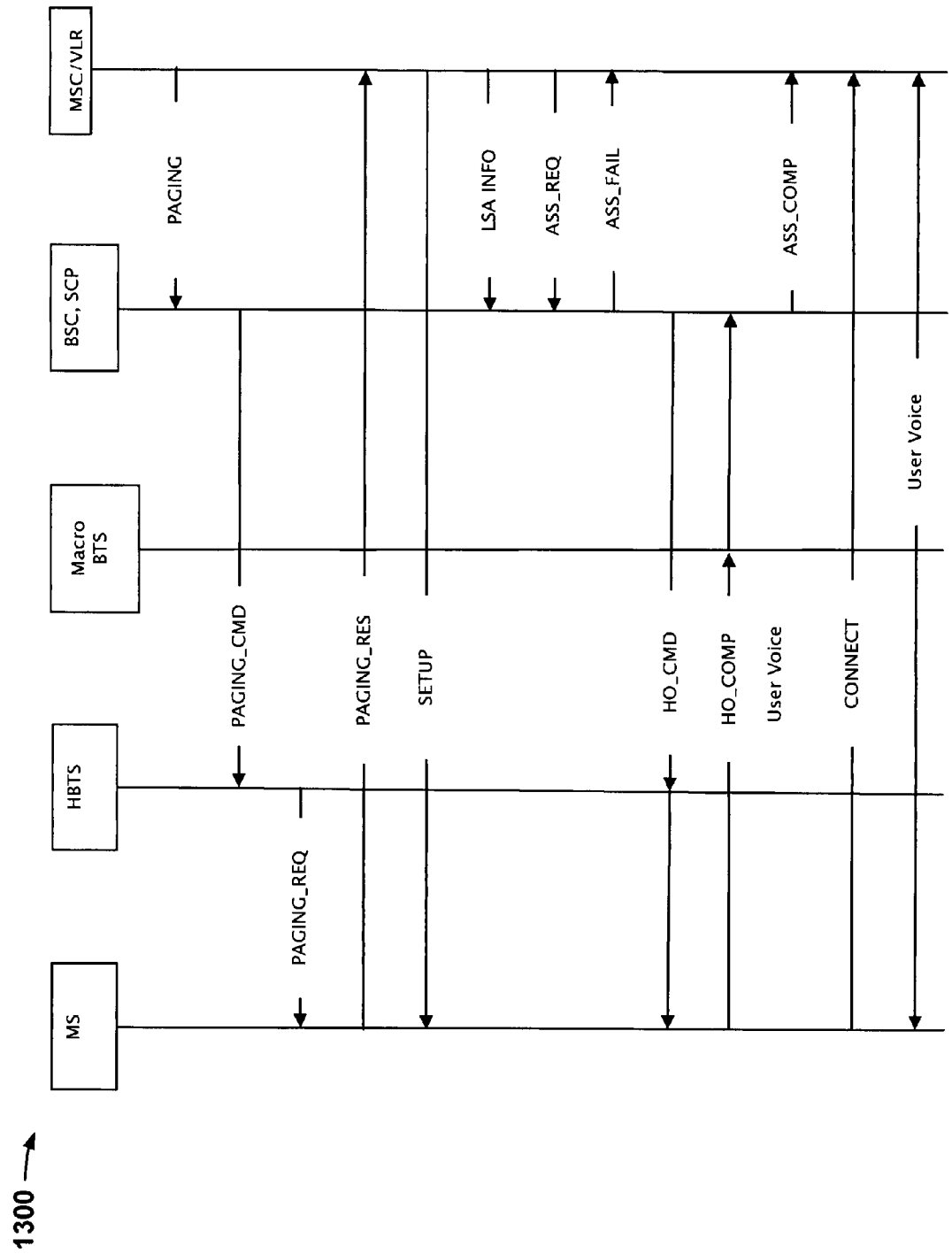
FIG. 13 is a call flow diagram illustrating an embodiment of a process for controlling access to a mobile network in the case of a mobile terminated call attempted to be connected via an HBTS to a user not authorized to use the HBTS for that purpose.

FIG. 13 is a call flow diagram illustrating an embodiment of a process for controlling access to a mobile network in the case of a mobile terminated call attempted to be connected via an HBTS to a user not authorized to use the HBTS for that purpose. Upon observing an attempt to terminate via the HBTS a call to an unauthorized MS, in the example call flow 1300 the BSC sends to the MS a handover command ("HO_CMD") message instructing the MS to complete a handover to a macro-BTS. Upon receiving a handover complete ("HO_COMP") message from the MS, via the macro-BTS, the BSC allows the call to be terminated. In some embodiments, the MSC does not send local security association (LSA) information to the BSC, as shown in FIG. 13, and instead the BSC or another BSS component is configured to determine whether the MS is authorized to use the HBTS or not. In some embodiments, the BSC or other BSS component obtains the IMSI of the MS (e.g., either on its own or via the MSC/VLR) and uses the IMSI to query an authorization database. In some embodiments, the BSC or other BSS component is provided, e.g., by the MSC/VLR (e.g., via LSA), in which case the BSS component does not need to know the IMSI of the MS in order to determine whether the MS is authorized to use the HBTS.

Figure 14:
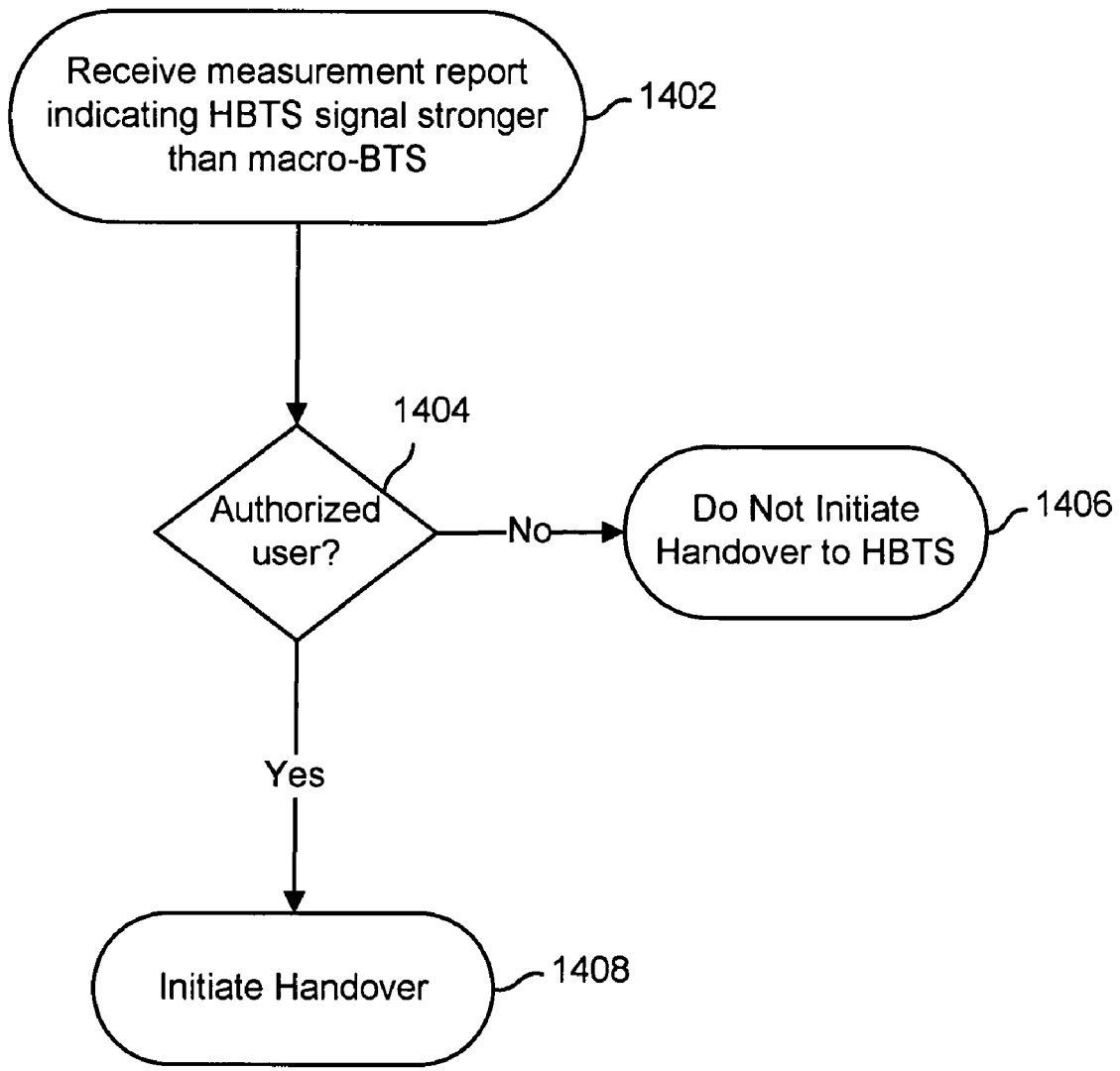
FIG. 14 is a flow chart illustrating an embodiment of a process for controlling access to a mobile network by only allowing authorized users of an HBTS to complete a handover to an HBTS.

FIG. 14 is a flow chart illustrating an embodiment of a process for controlling access to a mobile network by only allowing authorized users of an HBTS to complete a handover to an HBTS. In some embodiments, the process of FIG. 14 is implemented by a BSC with which the HBTS is associated, e.g., via which the HBTS has connectivity to an associated core mobile network. In the example shown, a measure report indicating that an HBTS's signal is stronger than a currently-serving (e.g., macro-) BTS is received (1402). It is determined whether the MS from which the measurement report was received is an authorized user of the HBTS (1404). If so, a handover to the HBTS is initiated (1408). If not, the MS continues to access the mobile network via the currently-serving BTS (1406), if applicable and/or available, or if applicable handover may be initiated to a cell other than the HBTS.

Configuring a mobile station (MS) to control access to a mobile network is disclosed. In some embodiments, an MS is configured, e.g., via the subscriber identity module (SIM) toolkit (STK) and/or one or more other applications running on and/or devices comprising the MS, to drop and/or otherwise prevent the MS being used to make, receive, and/or continue calls or other communications with or through a mobile network via an HBTS of which the MS is not an authorized user. In various embodiments, an STK application configured to cause the MS to drop and/or otherwise prevent the MS being used to make, receive, and/or continue calls or other communications with or through a mobile network via an HBTS of which the MS is not an authorized user is installed in the SIM before and/or after giving the SIM to the subscriber, e.g., in connection with providing an MS to the subscriber and/or configuring same. In some embodiments, over-the-air (OTA) is used to install such an application after the SIM has been given to the subscriber. Kits for installing such an application before and/or after giving the SIM to the subscriber are available commercially from Gemplus SA (also known as Gemalto NV) and others.

Figure 15:
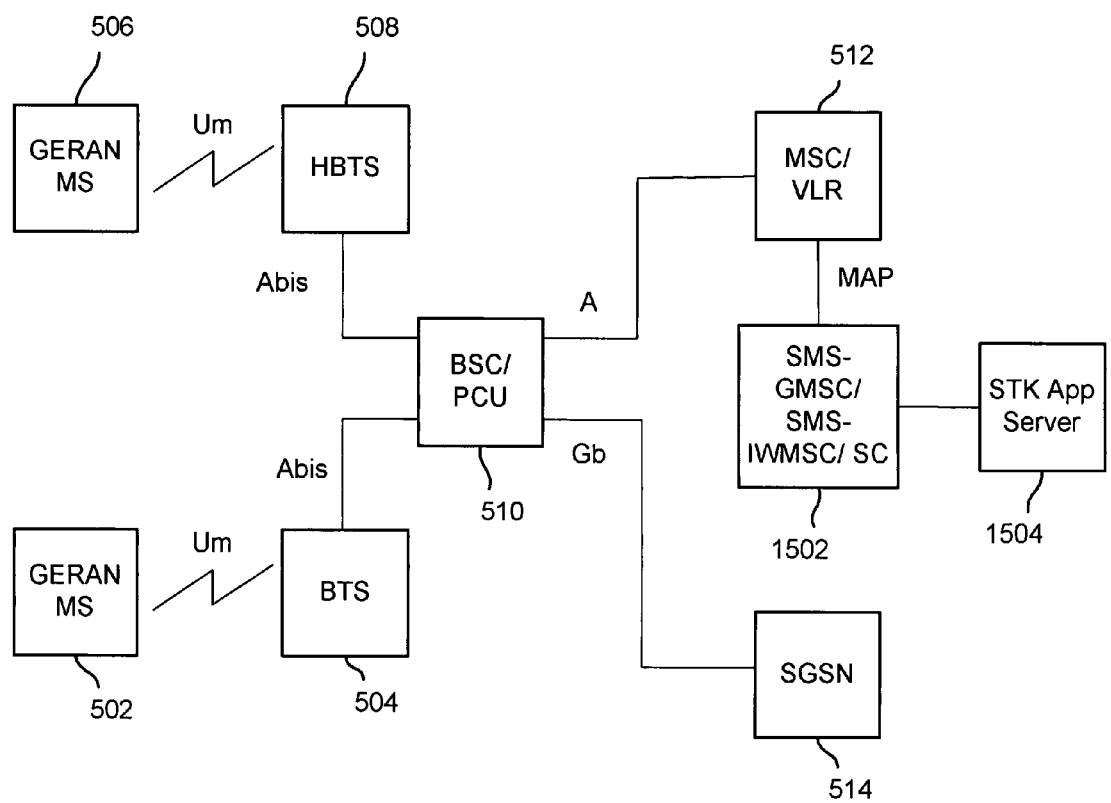
FIG. 15 is a block diagram illustrating an embodiment of a system for controlling access to a mobile network.

FIG. 15 is a block diagram illustrating an embodiment of a system for controlling access to a mobile network. In the example shown, the MSC 512 is connected via a MAP interface to a gateway MSC for short message service (SMS-GMSC)/inter-working MSC for short message service (SMS-IWMSC)/SMS service center (SM-SC) 1502, which is in turn connected to an STK application server 1504. In the example shown, a SIM application toolkit (STK) client/application configured to prevent use of an HBTS by an MS not authorized to use the HBTS is downloaded from STK application server 1504 to the MS, e.g., MS 502 and/or MS 506. The STK client/application in some embodiments implements one or more of the processes illustrated by FIGS. 16A-18B, described more fully below.

Figure 16A:
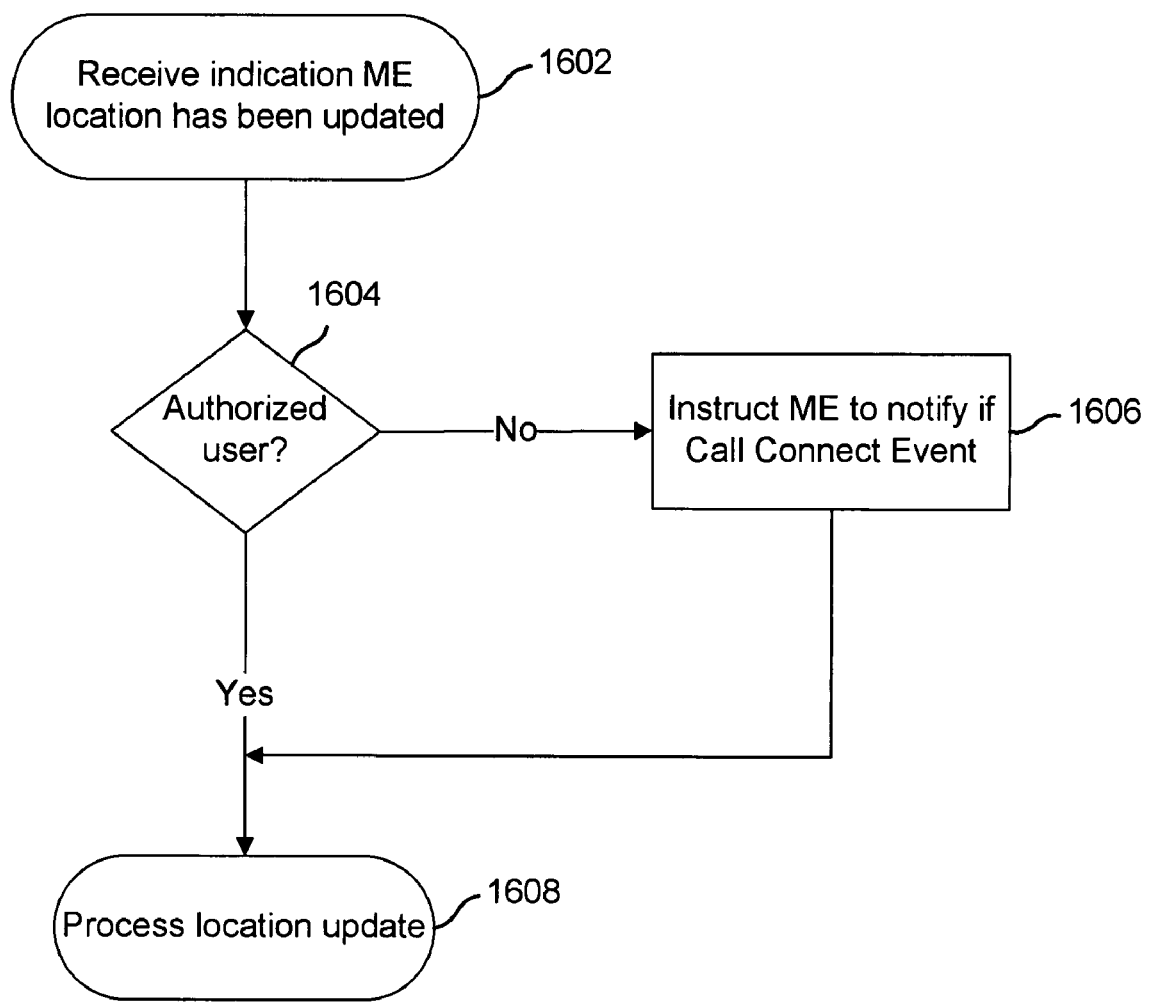
FIG. 16A is a flow chart illustrating an embodiment of a process for controlling access to a mobile network.

FIG. 16A is a flow chart illustrating an embodiment of a process for controlling access to a mobile network. In some embodiments, the process of FIG. 16A is implemented by an STK application running on an MS. The MS comprises a mobile equipment (ME) and an STK application running on and/or associated with a SIM installed on the ME. An indication is received that a location update has been performed (1602). The indication includes an identification of the BTS to which the location has been updated, at least in the case of a location update to an HBTS. It is determined whether the MS is associated with an authorized user of the HBTS (1604). If not, the ME is instructed to send a notification, e.g., to an STK application implementing the process of FIG. 16A, if a Call Connect event occurs. If the MS is associated with an authorized user of the HBTS or once the ME has been instructed to send the Call Connect event notification, the location update is processed normally (1608).

Figure 16B:
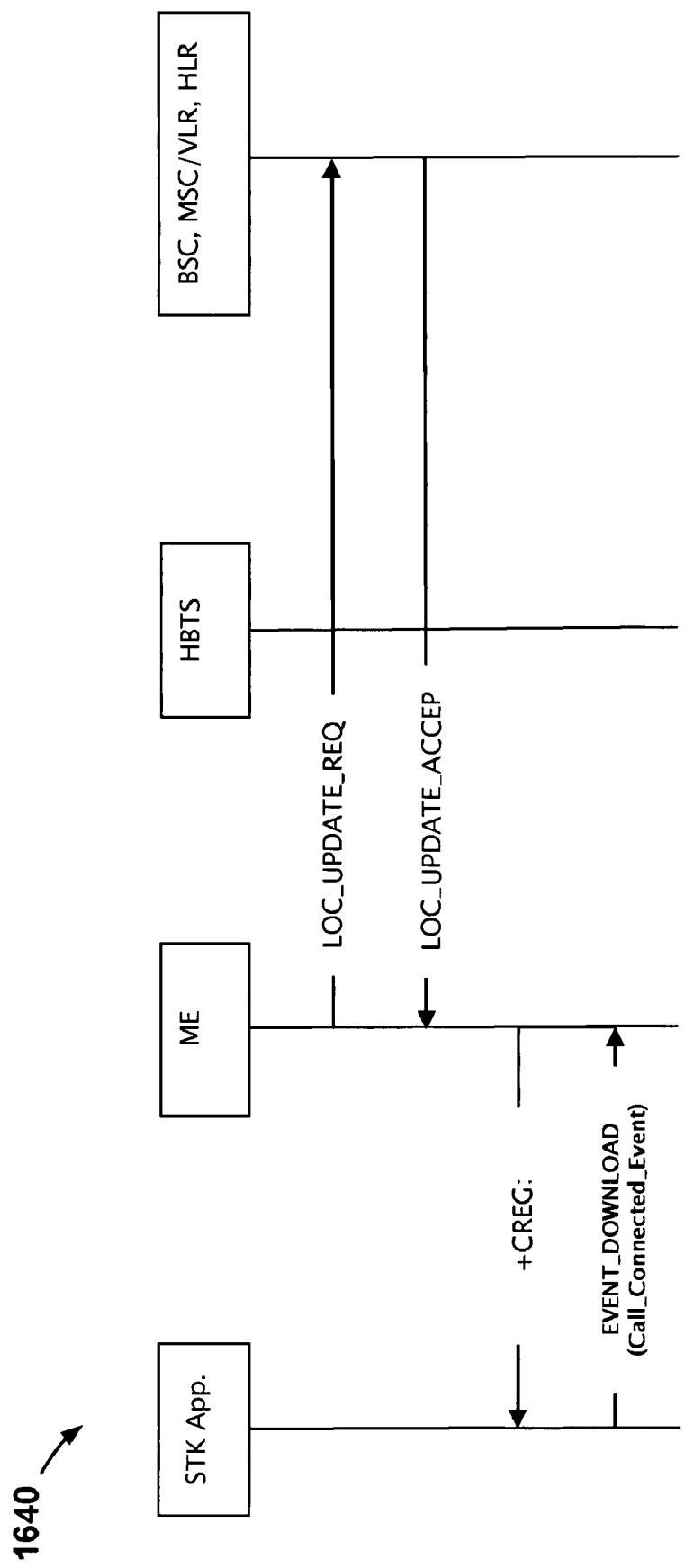
FIG. 16B is a call/message flow diagram illustrating an embodiment of a process for controlling access in a mobile network.

FIG. 16B is a call/message flow diagram illustrating an embodiment of a process for controlling access in a mobile network. In the example shown, the STK application and mobile equipment (ME) comprise a mobile station (MS) and messages between the STK application and the ME are internal to the MS. As indicated in the call flow 1640, upon receiving notification via the +CREG message that the location of the MS has been updated to an HBTS, an event download command instructing the ME to notify the STK application of any call connect event is sent by the STK application to the ME.

Figure 17A:
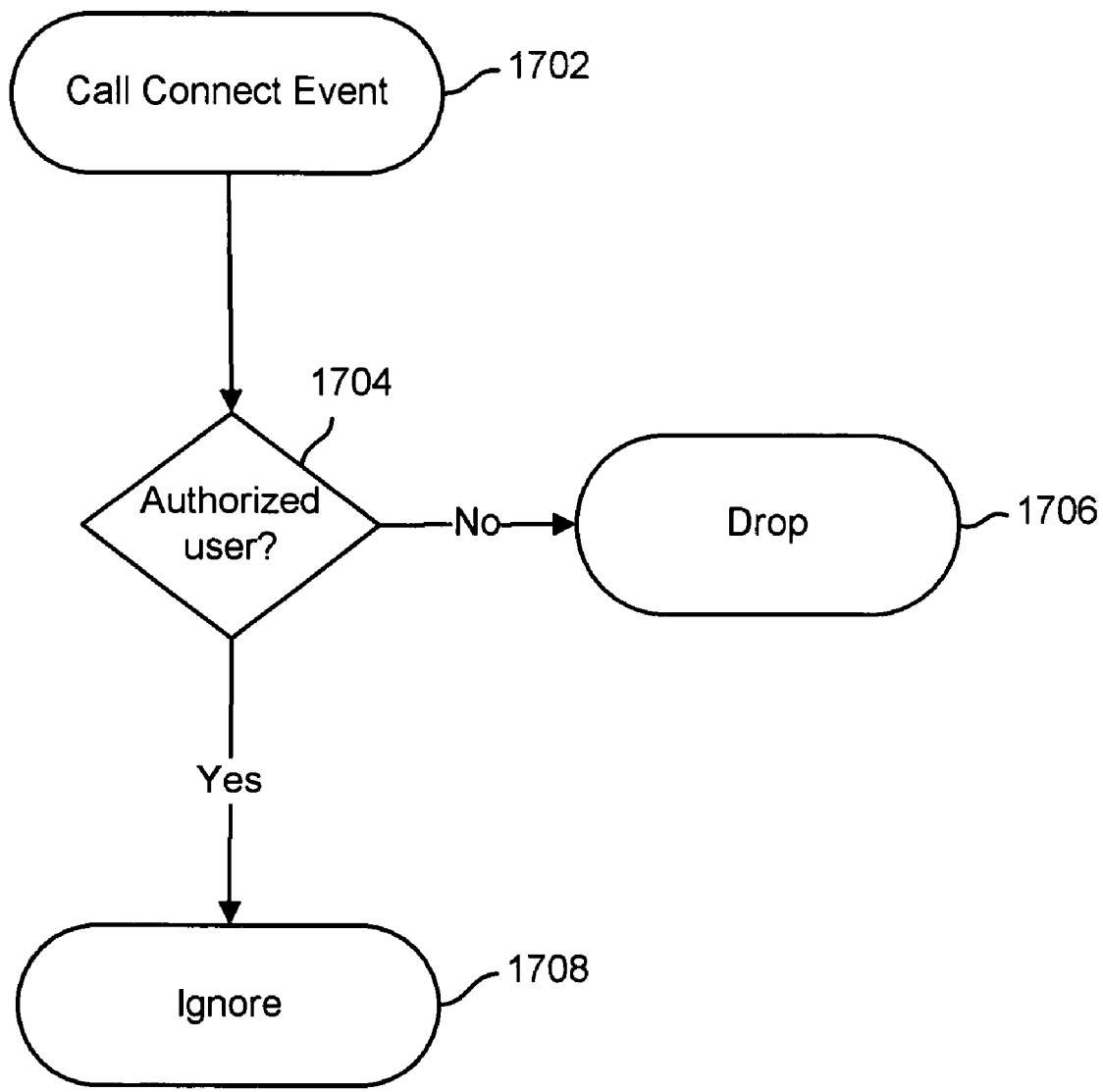
FIG. 17A is a flow chart illustrating an embodiment of a process for controlling access to a mobile network.

FIG. 17A is a flow chart illustrating an embodiment of a process for controlling access to a mobile network. In some embodiments, the process of FIG. 17A is implemented by an STK application. A call connect event notification is received (1702). It is determined whether the MS at which the call connect event has occurred is an authorized user of a current BTS via which the MS currently is connected to the mobile network (1704). If not, e.g., the MS is not an authorized user of an HBTS to which its location has been updated, the call is dropped (1706). Otherwise, no further action is taken and the call is allowed to proceed (1708).

Figure 17B:
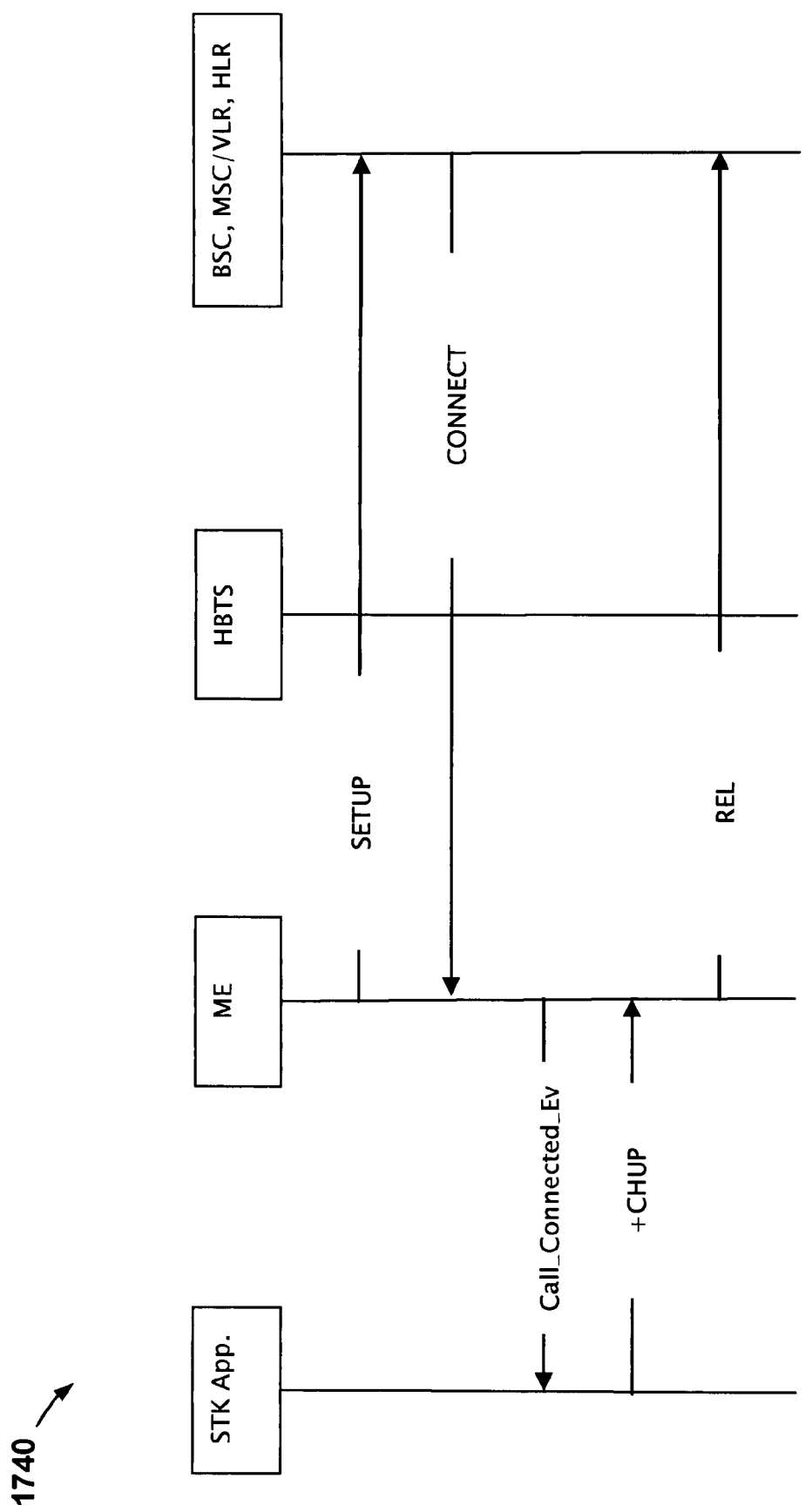
FIG. 17B is a call/message flow diagram illustrating an embodiment of a process for controlling access in a mobile network.

FIG. 17B is a call/message flow diagram illustrating an embodiment of a process for controlling access in a mobile network. In the call/message flow 1740 shown, upon receiving an indication that a call has been connected via an HBTS with respect to which the ME is not an authorized user, a +CHUP message is sent by the STK application to the ME to cause the ME to drop the call.

Figure 18A:
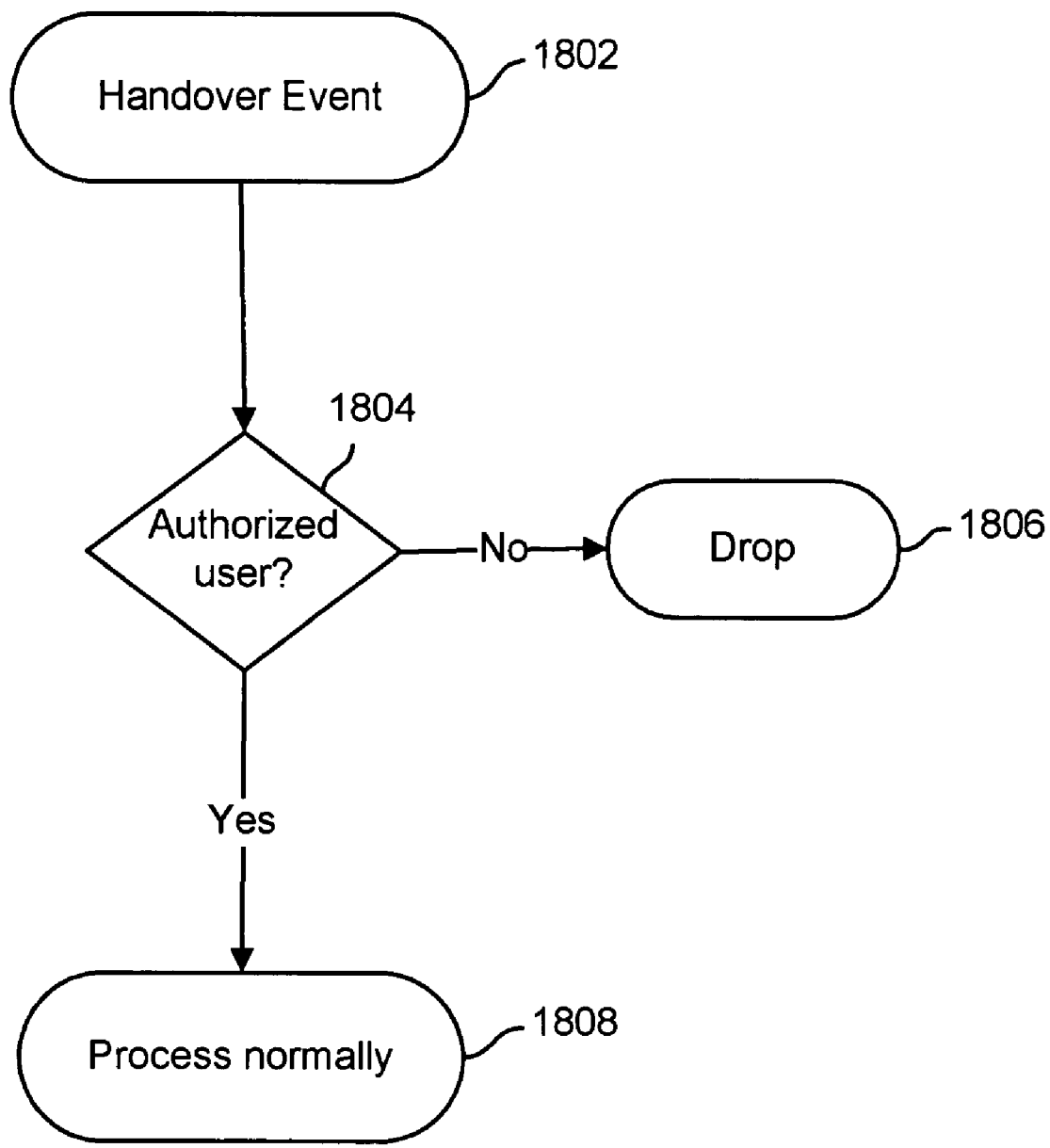
FIG. 18A is a flow chart illustrating an embodiment of a process for controlling access to a mobile network.

FIG. 18A is a flow chart illustrating an embodiment of a process for controlling access to a mobile network. In some embodiments, the process of FIG. 18A is implemented by an STK application and performed in the event a handover event occurs while a call is connected or other communication is occurring. An indication that a handover event has occurred during a call or other communication session is received (1802). It is determined whether the handover was to a BTS of which the MS is an authorized user (1804). If not, the call is dropped (1806). Otherwise, the call continues to be processed normally (1808).

Figure 18B:
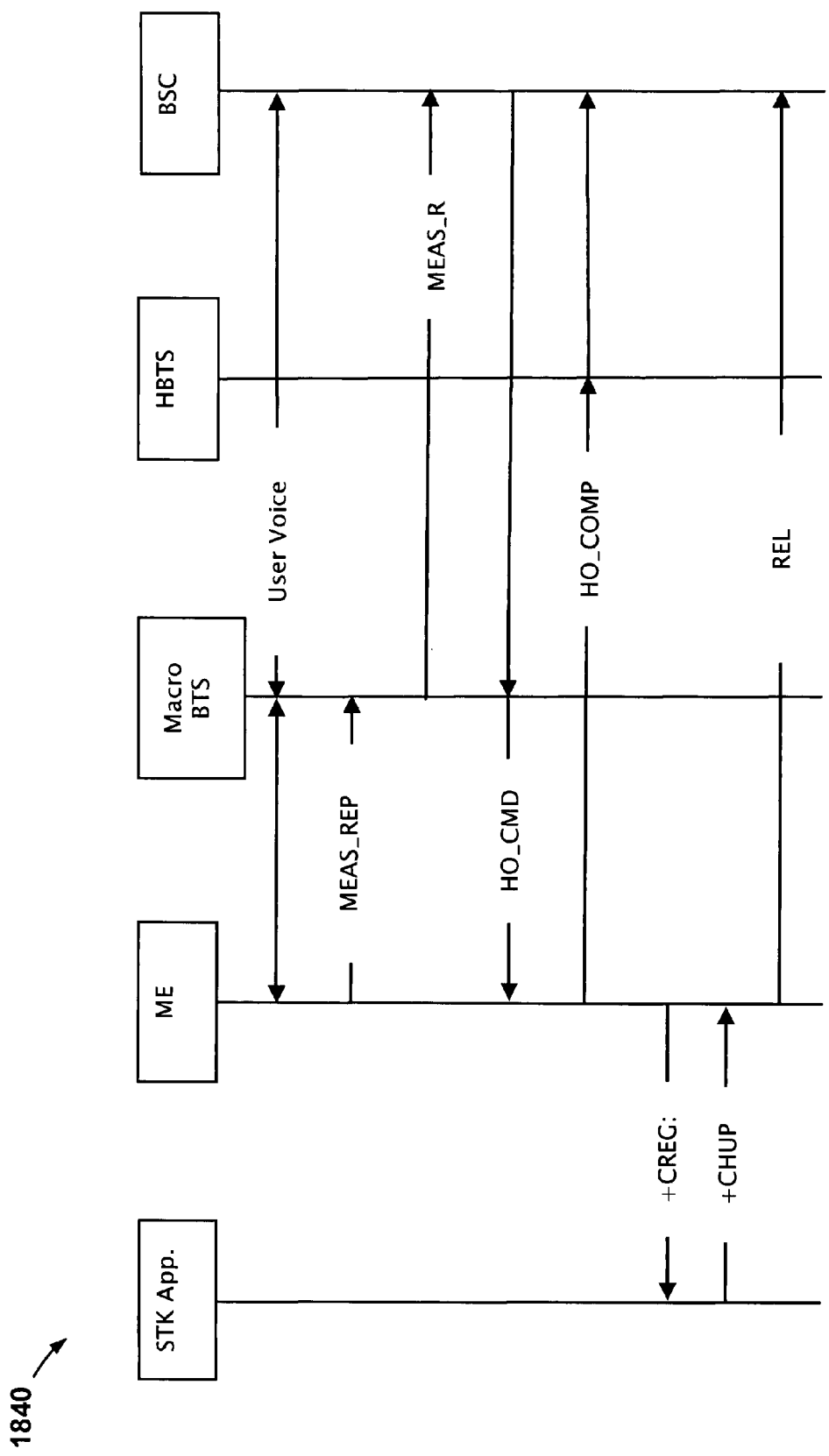
FIG. 18B is a call/message flow diagram illustrating an embodiment of a process for controlling access in a mobile network.

FIG. 18B is a call/message flow diagram illustrating an embodiment of a process for controlling access in a mobile network. In the call/message flow 1840 shown, upon receiving an indication that a handover has been completed, during a call or other communication session, to an HBTS with respect to which the ME is not an authorized user, a +CHUP message is sent by the STK application to the ME to cause the ME to drop the call.

While in many of the examples described in detail above the mobile network equipment/elements are identified by terms applicable in GSM and/or related networks, the techniques described herein may be applied as well in other networks and implemented in such networks by any suitable node or element, as applicable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of controlling use of a mobile network element, comprising:
   receiving, at a base station controller, an indication from a small base transceiver station that a mobile station associated with a mobile network is attempting to access the mobile network via the small base transceiver station, wherein the mobile station is not authorized to use the small base transceiver station to access the mobile network, wherein the small base transceiver station is located within a geographic area in which the mobile station is authorized to access the mobile network via a macro base transceiver station, and wherein the mobile station has requested a location update via the small base transceiver station;
   determining, at the base station controller, an identifier associated with the mobile station;
   determining, at the base station controller, whether the mobile station is authorized to access the mobile network via the small base transceiver station using the determined identifier associated with the mobile station; and
   if the base station controller determines that the mobile station is not authorized to access the mobile network via the small base transceiver station, forcing a handover of the mobile station from the small base transceiver station, wherein the forced handover is caused by a handover command generated by the base station controller and transmitted to the mobile station via the small base transceiver station even though the mobile station is not authorized to access the mobile network via the small base transceiver station.

2. The method according to claim 1, wherein the base station controller comprises a service control point that includes a database that identifies, by the identifier, mobile stations that are authorized to access the mobile network via the small base transceiver station associated with the base station controller.

3. The method according to claim 1, comprising determining that the mobile station is not authorized to access the mobile network via the small base transceiver station.

4. The method according to claim 3, wherein determining that the mobile station is not authorized to access the mobile network via the small base transceiver station comprises checking a database residing in the base station controller to determine whether the identifier associated with the mobile station is associated with a second identifier associated with the small base transceiver station.

5. The method according to claim 1, comprising associating, in a database residing in the base station controller, with the small base transceiver station a location area code specific to the small base transceiver station or a set of small base transceiver stations that includes the small base transceiver station.

6. The method according to claim 5, wherein said location area code comprises a first location area code and comprising not associating the small base transceiver station with a second location area code associated with the geographic area.

7. The method according to claim 1, wherein receiving an indication that the mobile station is attempting to access the mobile network via the small base transceiver station comprises one or more of the following: an indication that the mobile station has performed via the small base transceiver station a location update; an indication that the mobile station is attempting to establish via the small base transceiver station a call or other communication session; an indication that a call or other communication session terminated to or originated by the mobile station has been connected via the small base transceiver station; an indication that an attempt is being made to hand the mobile station over to the small base transceiver station; and an indication that the mobile station has been handed over to the small base transceiver station while a call or other communication session is in progress.

8. The method according to claim 1, comprising configuring the base station controller to force the handover in the event any mobile station that is associated with the mobile network but which is not associated with the small base transceiver station attempts to access the mobile network via the small base transceiver station.

9. The method according to claim 8, comprising making available to the base station controller a database that associates with the small base transceiver station one or more authorized mobile stations authorized to access the mobile network via the small base transceiver station.

10. The method according to claim 9, comprising downloading to and installing on the mobile station a SIM toolkit (STK) application that runs on the mobile station and that causes the mobile station to drop a call or other communication session connected via or handed over to the small base transceiver station.

11. The method according to claim 1, wherein preventing the mobile station from accessing the mobile network via the base transceiver station comprises running an application on the mobile station that causes the mobile station to drop a call or other communication session.

12. The method according to claim 11, wherein the SIM toolkit (STK) application is configured to instruct a mobile equipment comprising the mobile station to inform the SIM toolkit (STK) application in the event a call or other communication session is connected via the small base transceiver station.

13. The method according to claim 1, wherein the small base transceiver station is connected to a base station controller via at least the following: a packet network; a gateway that serves a plurality of small base transceiver stations over the packet network; and a dedicated link from the gateway to the base station controller.

14. A method of controlling use of a mobile network element, comprising:
receiving, at a base station controller, an indication from a small base transceiver station that a mobile station associated with a mobile network is attempting to access the mobile network via the small base transceiver station, wherein the mobile station is not authorized to use the small base transceiver station to access the mobile network, wherein the small base transceiver station is located within a geographic area in which the mobile station is authorized to access the mobile network via a macro base transceiver station, and wherein the mobile station has requested a location update via the small base transceiver station;
determining, at the base station controller, an identifier associated with the mobile station;
determining, at the base station controller, whether the mobile station is authorized to access the mobile network via the small base transceiver station using the determined identifier associated with the mobile station; and
if the base station controller determines that the mobile station is not authorized to access the mobile network via the small base transceiver station, forcing a handover of the mobile station from the small base transceiver station, wherein forcing the handover comprises sending, via the small base transceiver station that the mobile station is not authorized to use to access the mobile network, a handover command, originating from the base station controller, that identifies the macro base transceiver station, and wherein forcing the handover comprises sending, via the macro base transceiver station, a handover complete command that terminates at the base station controller.

15. The method according to claim 14, wherein the small base transceiver station is connected to a base station controller via at least the following: a packet network; a gateway that serves a plurality of small base transceiver stations over the packet network; and a dedicated link from the gateway to the base station controller.

16. A mobile network element, comprising:
a communication interface of a base station controller configured to receive an indication that a mobile station associated with a mobile network is attempting to access the mobile network via a small base transceiver station, wherein the mobile station is not authorized to use the small base transceiver station to access the mobile network, wherein the small base transceiver station is located within a geographic area in which the mobile station is authorized to access the mobile network via a macro base transceiver station, and wherein the mobile station has requested a location update via the small base transceiver station, wherein the base station controller determines an identifier associated with the mobile station, wherein the base station controller determines whether the mobile station is authorized to access the mobile network via the small base transceiver station using the determined identifier associated with the mobile station; and
a processor of the base station controller coupled to the communication interface and configured to force a handover of the mobile station from the small base transceiver station to a macro base transceiver station if the base station controller determines that the mobile station is not authorized to access the mobile network via the small base transceiver station, wherein the forced handover is caused by a handover command generated by the base station controller and transmitted to the mobile station via the small base transceiver station even though the mobile station is not authorized to access the mobile network via the small base transceiver station.

17. The mobile network element according to claim 16, wherein the small base transceiver station is connected to a base station controller via at least the following: a packet network; a gateway that serves a plurality of small base transceiver stations over the packet network; and a dedicated link from the gateway to the base station controller.

18. A computer program product for controlling use of a mobile network element, the computer program product being embodied in a tangible computer-readable medium and comprising computer instructions for:
receiving, at a base station controller, an indication from a small base transceiver station that a mobile station associated with a mobile network is attempting to access the mobile network via the small base transceiver station, wherein the mobile station is not authorized to use the small base transceiver station to access the mobile network, is located within a geographic area from which the mobile station is authorized to access the mobile network via a macro base transceiver station, and wherein the mobile station has requested a location update via the small base transceiver station;
determining, at the base station controller, an identifier associated with the mobile station;
determining, at the base station controller, whether the mobile station is authorized to access the mobile network via the small base transceiver station using the determined identifier associated with the mobile station;
if the base station controller determines that the mobile station is not authorized to access the mobile network via the small base transceiver station, refusing attempts by the mobile station to obtain service from the mobile network via the base transceiver station by refusing attempts from the base transceiver station to register the mobile station for services via the small base transceiver station; and
if the base station controller determines that the mobile station is not authorized to access the mobile network via the small base transceiver station, forcing a handover of the mobile station from the small base transceiver station, wherein the forced handover is caused by a handover command generated by the base station controller and transmitted to the mobile station via the small base transceiver station even though the mobile station is not authorized to access the mobile network via the small base transceiver station.

19. A mobile network element, comprising:
a communication interface of a base station controller configured to receive an indication that a mobile station associated with a mobile network is attempting to access the mobile network via a small base transceiver station, wherein the mobile station is not authorized to use the small base transceiver station to access the mobile network, wherein the small base transceiver station is located within a geographic area in which the mobile station is authorized to access the mobile network via a macro base transceiver station, and wherein the mobile station has requested a location update via the small base transceiver station, wherein the base station controller determines an identifier associated with the mobile station, wherein the base station controller determines whether the mobile station is authorized to access the mobile network via the small base transceiver station using the determined identifier associated with the mobile station; and a processor of the base station controller coupled to the communication interface and configured to force a handover of the mobile station from the small base transceiver station to a macro base transceiver station if the base station controller determines that the mobile station is not authorized to access the mobile network via the small base transceiver station, wherein forcing the handover comprises sending, via the small base transceiver station that the mobile station is not authorized to use to access the mobile network, a handover command, originating from the base station controller, that identifies the macro base transceiver station, and wherein forcing the handover comprises sending, via the macro base transceiver station, a handover complete command that terminates at the base station controller.

20. The mobile network element according to claim 19, wherein the small base transceiver station is connected to a base station controller via at least the following: a packet network; a gateway that serves a plurality of small base transceiver stations over the packet network; and a dedicated link from the gateway to the base station controller.

* * * * *